United States Patent
Robbins

(10) Patent No.: US 7,375,739 B2
(45) Date of Patent: May 20, 2008

(54) IMAGE MANAGEMENT SYSTEM OPERABLE TO MANAGE THE FORMATION OF DYNAMICALLY VARIABLE IMAGES IN OBJECTS IN SINGLE SHOT EVENTS

(75) Inventor: Gene A. Robbins, Lake Zurich, IL (US)

(73) Assignee: Vardex Laser Corporation, Lake Zurich, IL (US)

( * ) Notice: Subject to any disclaimer, the term of this patent is extended or adjusted under 35 U.S.C. 154(b) by 191 days.

(21) Appl. No.: 11/226,482

(22) Filed: Sep. 14, 2005

(65) Prior Publication Data

US 2006/0262182 A1 Nov. 23, 2006

Related U.S. Application Data

(60) Provisional application No. 60/683,271, filed on May 20, 2005, provisional application No. 60/681,396, filed on May 17, 2005.

(51) Int. Cl.
*B41J 2/47* (2006.01)
*B41J 2/455* (2006.01)
*B41J 2/435* (2006.01)
*G01D 15/14* (2006.01)

(52) U.S. Cl. .................. 347/239; 347/255; 347/233; 347/224

(58) Field of Classification Search ............... 359/298; 347/239, 255, 233, 224
See application file for complete search history.

(56) References Cited

U.S. PATENT DOCUMENTS

| | | | |
|---|---|---|---|
| 1,906,094 A | 4/1933 | Powell | |
| 3,094,920 A | 6/1963 | Priesmeyer | |
| 3,779,159 A | 12/1973 | Rose et al. | |
| 4,636,043 A | 1/1987 | Bellar | |
| 4,839,181 A | 6/1989 | MacMurray et al. | |
| 4,843,958 A | 7/1989 | Egosi | |
| 5,021,631 A | 6/1991 | Ravellat | |
| 5,120,928 A | 6/1992 | Piliero | |

(Continued)

FOREIGN PATENT DOCUMENTS

DE 43 22 252 A1 1/1995

(Continued)

OTHER PUBLICATIONS

Kawochka, John, The Next Frontier: Barcoding the Tablet [online], [retrieved on Aug. 22, 2005]. Retrieved from the Internet <URL: http://www.pharmamanufacturing.com/articles/2005/327.html>.

(Continued)

*Primary Examiner*—Hai Pham
*Assistant Examiner*—Kainoa B Wright
(74) *Attorney, Agent, or Firm*—Bell, Boyd and Lloyd

(57) ABSTRACT

A supply chain monitoring system having a laser-based image system usable within an object processing facility to form images in objects, a reader operable to read the images on the objects, and an object tracking system coupled to the reader over a data network. The laser-based image system includes an image forming device operable to form an array of laser-treated regions in the objects in single shot events, where the arrays of laser-treated regions are associated with images.

33 Claims, 37 Drawing Sheets

U.S. PATENT DOCUMENTS

| | | |
|---|---|---|
| 5,142,976 A | 9/1992 | Roulleau |
| 5,248,992 A | 9/1993 | Ferschl |
| 5,356,081 A | 10/1994 | Sellar |
| 5,408,590 A | 4/1995 | Dvorzsak |
| 5,660,747 A | 8/1997 | Drouillard et al. |
| 5,821,497 A | 10/1998 | Yamazaki et al. |
| 5,892,533 A | 4/1999 | Tanimoto et al. |
| 5,897,797 A | 4/1999 | Drouillard et al. |
| 6,038,056 A * | 3/2000 | Florence et al. ............ 359/290 |
| 6,180,914 B1 | 1/2001 | Jones et al. |
| 6,429,889 B1 | 8/2002 | Murokh |
| 6,469,834 B1 * | 10/2002 | Shahzad et al. ............ 359/622 |
| 6,493,019 B1 | 12/2002 | Hirasawa |
| 6,791,592 B2 | 9/2004 | Assa et al. |
| 6,796,241 B2 | 9/2004 | Catalan et al. |
| 6,803,539 B2 | 10/2004 | Liu et al. |
| 6,810,796 B2 | 11/2004 | Catalan et al. |
| 6,829,000 B2 | 12/2004 | Assa et al. |
| 6,836,284 B2 * | 12/2004 | Murokh et al. ............. 347/255 |
| 2001/0006399 A1 * | 7/2001 | Chiba ......................... 347/224 |
| 2002/0011311 A1 | 1/2002 | Carignan et al. |
| 2003/0206227 A1 | 11/2003 | Assa et al. |
| 2004/0125366 A1 * | 7/2004 | Kiani et al. .............. 356/237.1 |
| 2004/0130612 A1 | 7/2004 | Assa et al. |
| 2004/0141052 A1 | 7/2004 | Assa et al. |
| 2005/0088510 A1 | 4/2005 | Assa et al. |

FOREIGN PATENT DOCUMENTS

| | | |
|---|---|---|
| DE | 101 09 109 A1 | 10/2001 |
| GB | 2 400 956 | 10/2004 |
| JP | 59114062 | 6/1984 |
| JP | 60000979 | 1/1985 |
| JP | 2000-168157 | 6/2000 |
| JP | 2001-136859 | 5/2001 |
| JP | 2003088966 | 3/2003 |
| SU | 1748768 | 7/1992 |
| SU | 1780668 | 12/1992 |
| WO | WO 01/56789 A1 | 8/2001 |
| WO | WO2004/064530 A2 | 8/2004 |

OTHER PUBLICATIONS

Designers and Manufacturers of Filing and Packaging Machinery, EAM Corp. [online], [retrieved on Aug. 22, 2005]. Retrieved from the Internet <URL: http://www.eamcorp.com>.

Rägo, Lembit MD, PhD, Counterfeit drugs: Threat to Public Health, Geneva, Switzerland, The Global Forum on Pharmaceutical Anticounterfeiting, Sep. 22-25, 2002.

"Oral Statement of James Christian," Vice President and Head of Global Corporate Security, Novartis International AG, Before the Subcommittee on Commerce, Trade, and Consumer Protection, House Energy and Commerce Committee, Jun. 15, 2005.

* cited by examiner

FIG. 35

| FACILITY VARIABLE 716 | IMAGE FORMING DEVICE VARIABLE 718 | PRODUCT VARIABLE 720 | VOLUME VARIABLE 722 | IMAGE VARIABLE 724 | DATE VARIABLE 726 | TIME VARIABLE 728 |
|---|---|---|---|---|---|---|
| 022 | 003 | 4331 | 1000 | 052 | 03 02 2008 | 1300 |
| ... | ... | ... | ... | ... | ... | ... |
| ... | ... | ... | ... | ... | ... | ... |

CONTROL VARIABLES 712

IMAGE MANAGEMENT SYSTEM OPERABLE TO MANAGE THE FORMATION OF DYNAMICALLY VARIABLE IMAGES IN OBJECTS IN SINGLE SHOT EVENTS

PRIORITY CLAIM

This application is a non-provisional of and claims priority to and the benefit of U.S. Patent Application Ser. No. 60/681,396, filed May 17, 2005 and U.S. Patent Application Ser. No. 60/683,271, filed May 20, 2005, the entire contents and disclosures of which are incorporated herein.

CROSS REFERENCES TO RELATED APPLICATIONS

This application is related to the following commonly-owned co-pending patent applications: "LASER-BASED IMAGE FORMER OPERABLE TO FORM DYNAMICALLY VARIABLE IMAGES IN OBJECTS IN SINGLE SHOT EVENTS," Ser. No. 11/226,015; "OBJECT PROCESSING ASSEMBLY OPERABLE TO FORM DYNAMICALLY VARIABLE IMAGES IN OBJECTS IN SINGLE SHOT EVENTS", Ser. No. 11/225,995; and "TRACKING SYSTEM FOR DISTRIBUTABLE OBJECTS WHICH ARE MARKED IN SINGLE LASER SHOT EVENTS WITH DYNAMICALLY VARIABLE IMAGES," Ser. No. 11/226,006.

BACKGROUND OF THE INVENTION

The counterfeiting of products poses a significant threat to the safety and integrity of supply chains. Counterfeiting also jeopardizes the good will in well-established product brand names. Companies have taken different approaches in an attempt to deter counterfeiting. One approach includes printing ink-printed bar codes and identifiers on products. Another approach is inscribing the company's brand name or logo on the product. Despite these efforts, many counterfeiters have introduced counterfeits of these products into the supply chain through the use of commercially available printers and other machinery, and in many cases, the counterfeits have reached the end-user without being detected. For these and other reasons, there is a need to provide advancements related to the marking of products and objects.

SUMMARY OF THE INVENTION

A supply chain monitoring system is provided to assist in the monitoring and tracking of objects and products in the supply chain. In one embodiment, the monitoring system includes a laser marking system used in a facility where objects or products are manufactured, packaged or processed. The laser marking system outputs an array of separate laser beams or laser beam pulses. For example, the array of beam pulses can form a matrix of ten by ten beam pulses, or the array of beam pulses can form a pattern of fifty bars. Accordingly, the laser marking system can burn or cut a machine-readable matrix code, bar code or other suitable image in the body of a product. In accordance with a user-configurable computer program, the laser marking system can produce a unique image or code on each product in a batch, or the laser system can produce serial images or codes on a batch of products.

The laser marking system is operable to burn or cut codes in products in a relatively small amount of time. In one embodiment, the laser marking system produces a snap-shot of beam pulses. The snap-shot of beam pulses strike the product at the same time or substantially at the same time. In this fashion, an entire image or code is burn or cut in each product in an instant or single event. In one embodiment, this high speed coding process enables the products to be imaged or coded while in motion on the conveyor line with no or substantially no smearing or blurring effect.

In one embodiment, the supply chain monitoring system also includes an image or code management system, an image or code reader and an object tracking or validation system, each of which is linked to a network, such as the Internet. In one example, the code management system controls the codes formed in the products and also transfers the code data to the validation system. When a user, such as a retailer, warehouser or consumer, scans the codes on the products, the validation system alerts the user of any instances where a product does not have the proper code. The user can then remove this product from the supply chain and contact the appropriate authorities for counterfeit investigation. This type of supply chain monitoring system functions as a deterrent against counterfeiting and helps enhance the security and safety of supply chains.

Additional features and advantages of the present invention are described in, and will be apparent from, the following Detailed Description of the Invention and the figures.

BRIEF DESCRIPTION OF THE FIGURES

FIG. 35 is a table of example control variables used in one embodiment of the image management system.

DETAILED DESCRIPTION OF THE INVENTION

1. Supply Chain Monitoring System

Figure 1:
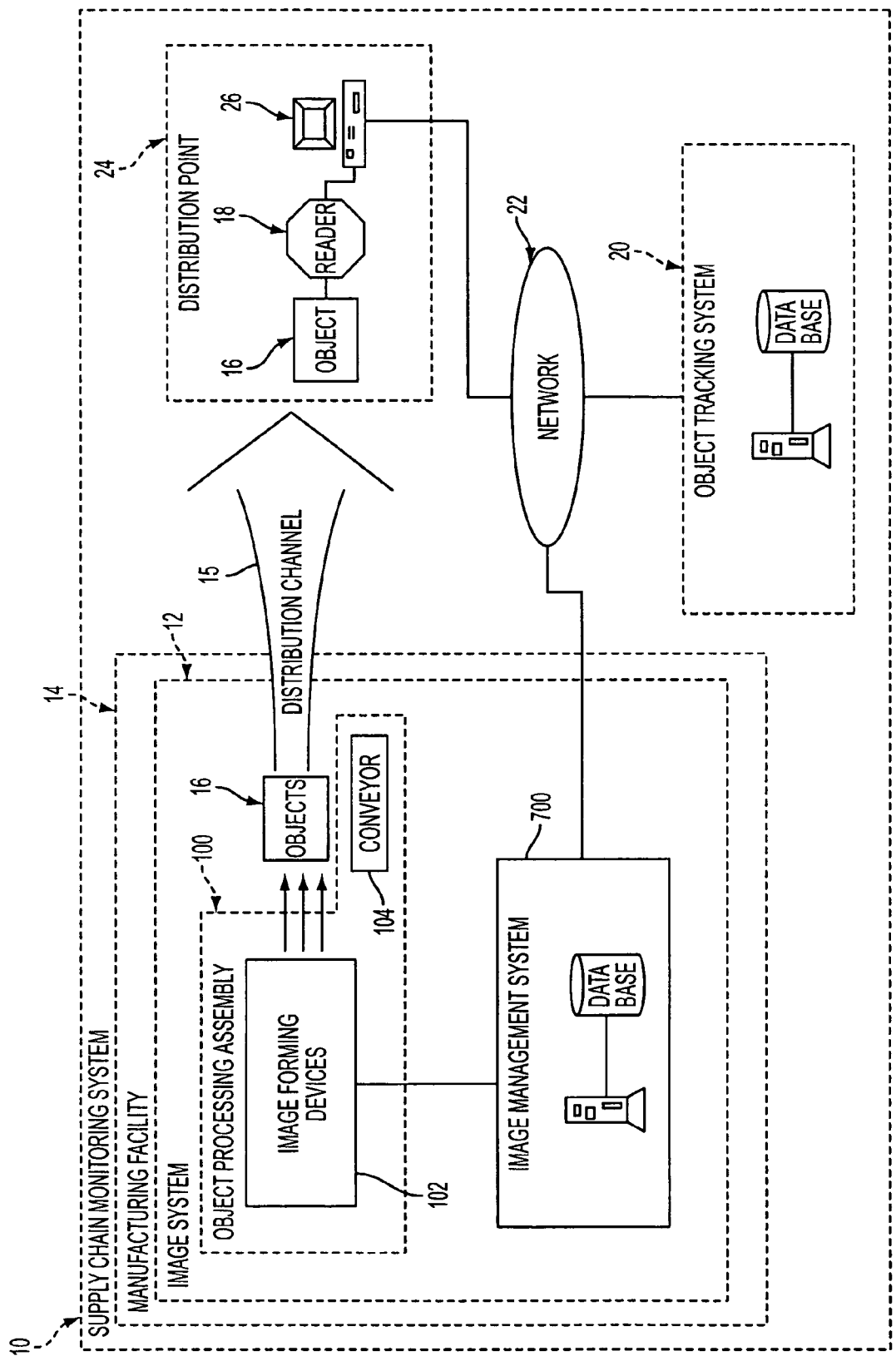
FIG. 1 is a schematic, diagrammatic view of one embodiment of the supply chain monitoring system.

Referring now to FIGS. 1 through 38, the supply chain monitoring system 10, in one embodiment, includes: (a) a laser-based image system 12 which may be fully or partially housed or located within a manufacturing facility or object processing facility 14 and which is used to form images on products or objects 16; (b) a reader 18 which is operable to read the images on the objects 16; and (c) a product or an object tracking system 20 which is coupled to the reader 18 over a data network 22, such as the Internet or any other suitable network. The object processing facility 14 can include any building, facility or plant used to manufacture, package, process or otherwise treat objects. It should be appreciated that the image system 12 can form an image or marking on a relatively broad range of objects 16. The objects 16 can include, without limitation, products, goods and devices, such as: (a) pharmaceutical-related products and devices, such as capsules and tablets and other forms of ingestible medication; (b) police, warfare and military-related products, devices, equipment and supplies, such as munitions, weapon parts and other mission-critical equipment and devices; (c) medical products, devices, equipment and supplies; (d) security-related products, devices and equipment; (e) hazard response-related products, devices and equipment, such as firefighting equipment; (f) air, land and water vehicular replacement parts; and (g) edible products, produce and other foods. Depending upon the embodiment, the image formed on the object 16 can be machine readable, human readable or readable by machine and human.

In operation of one example, the objects 16 are distributed from the facility 14 through a supply chain or distribution channel 15 to one or more distribution points 24. A distribution point 24 can include any location, facility, building, truck, carrier, retail outlet or consumption site where the objects 16 are temporarily or permanently stationed. Whether the distribution point 24 is a store or a home, the user can scan the image of a code on the object 16 using a reader 18 which is coupled to a server or computer 26. The object tracking system 20, in communication with the computer 26, receives the code data, and the tracking system 20 validates the authenticity of the scanned object 16, as further described below.

2. Object Processing Assembly

Figure 2:
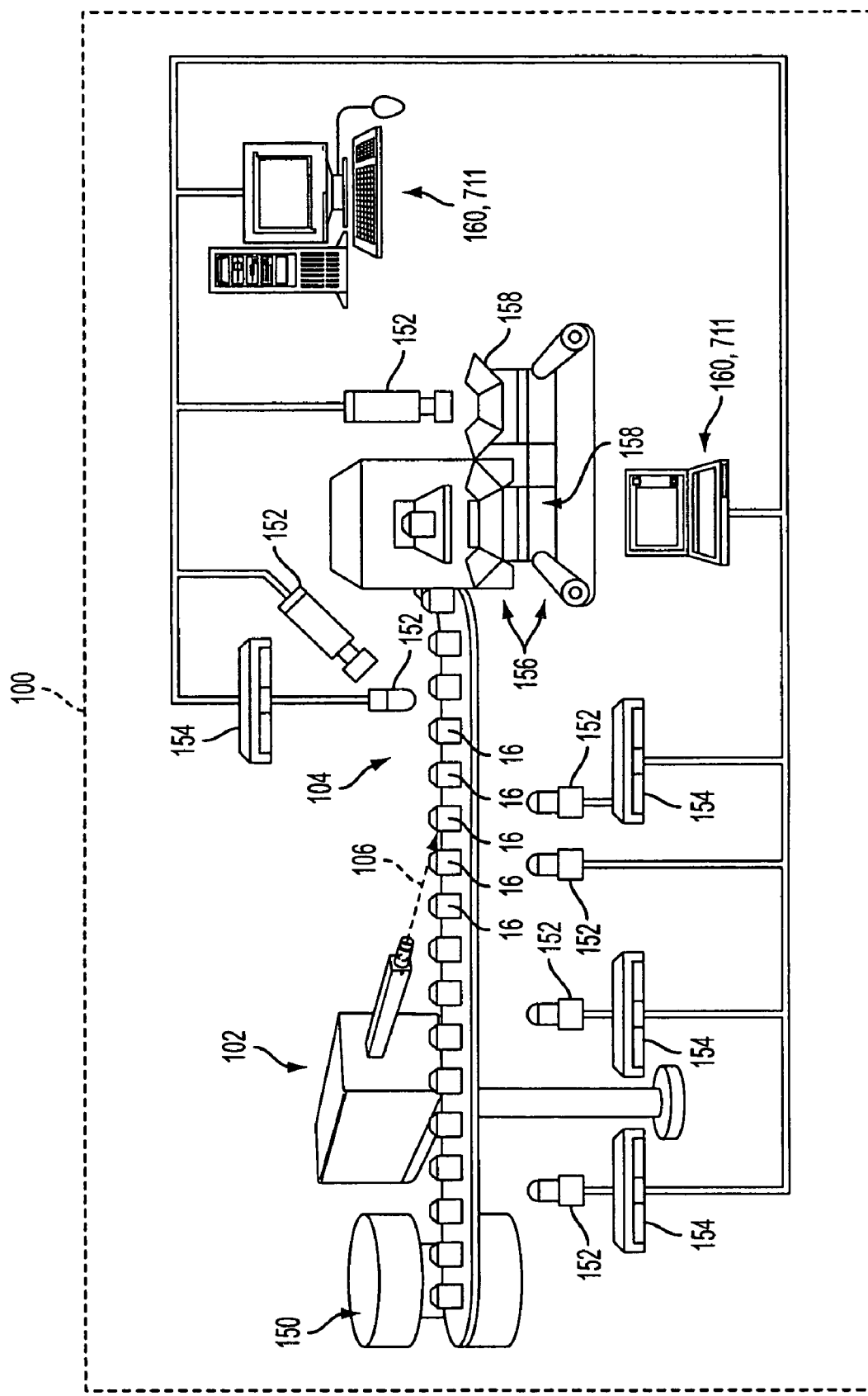
FIG. 2 is a perspective view of one embodiment of the object processing assembly, illustrating the image former forming an image in one of the objects in motion on the conveyor.

In one embodiment, the laser-based image system 12 includes an object processing assembly 100, as illustrated in FIG. 2. The object processing assembly 100, in one embodiment, includes: (a) at least one image forming device or image former 102; (b) at least one object transporter or conveyor 104 having a designated position relative to the image former 102; (c) an object dispenser or hopper 150 which distributes objects 16 onto the conveyor 104; (d) a plurality of high-speed cameras or vision devices 152 which sense visual characteristics of the assembly 100, such as the proper placement of the objects 16 and the quality of the images formed in the objects 16 by the image former 102; (e) a plurality of processors or controllers 154 which control the operation of the vision devices 152; (f) a packaging device or packager 156 which packages the objects 16 and places them in packages 158; and (g) a plurality of computers or computerized workstations 160 used to operate the object processing assembly 100. The conveyor 104 supports a plurality of the objects 16, and the conveyor 104 transports or moves those objects 16 from one point to another within the processing facility 14. In one embodiment, the image former 102 outputs a sequence of beam pulses 106, and each of the beam pulses 106 strikes one of the objects 16, as further described below. In one embodiment, one or more of the workstations 160 can include the computer 711 of the image management system 700 described below with respect to FIG. 34.

2.1. Image Forming Device with Single Energy Generator 2.1.1 General

Figure 3:
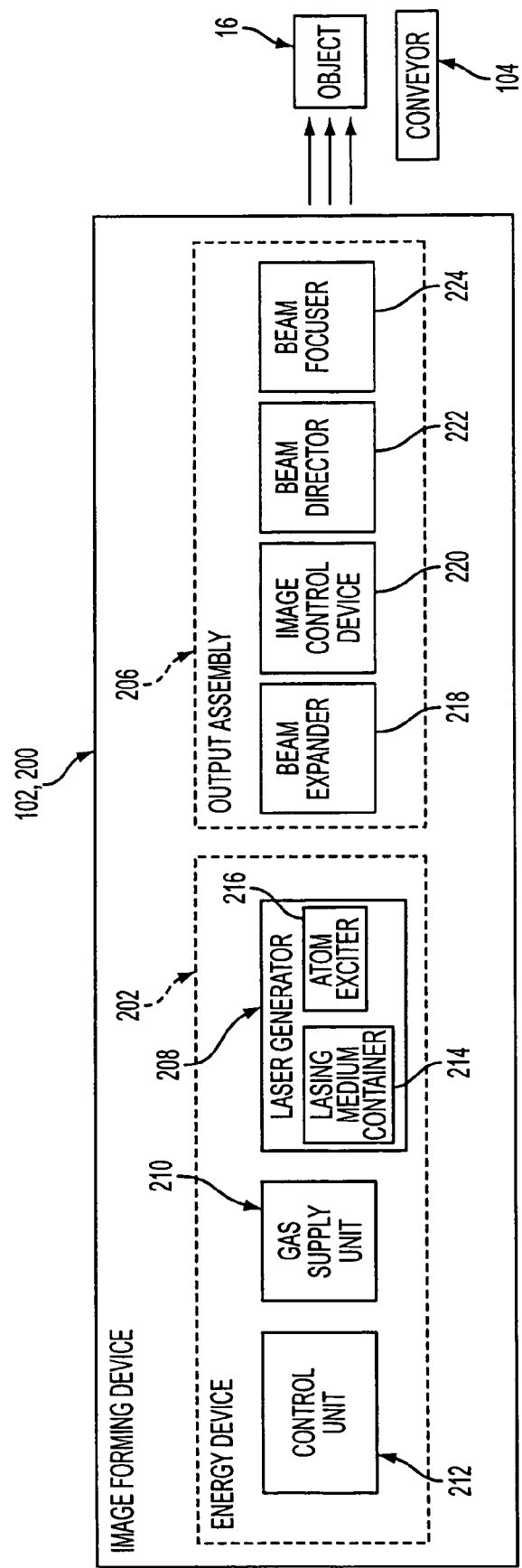
FIG. 3 is a schematic, diagrammatic view of one embodiment of the image former or image forming device.

In one embodiment illustrated in FIG. 3, the image forming device or image former 102 is an image former 200 which has a single energy generator or laser generator. The image former 200, in one embodiment, includes: (a) an energy device 202 which generates a laser form of energy; and (b) an output assembly 206 which receives the laser form of energy and directs that energy toward the objects 16. The energy device 202 can include any suitable laser, including, without limitation, a solid-state laser (including, without limitation, a neodymium:yttrium-aluminum garnet (YAG) neodymium laser), a gas laser, an excimer laser, a dye laser or a semiconductor laser, sometimes referred to as a diode laser. In one embodiment, the energy device 202 includes a carbon dioxide ($CO_2$) laser which emits laser energy in the far-infrared range, generating an energy having a wave length of approximately ten thousand six hundred nanometers.

In one embodiment, the energy device 202 includes a laser generator 208 operatively coupled to a carbon dioxide gas supply unit 210 which, in turn, is operatively coupled to a control unit 212. The gas supply unit 210 includes a holder for a gas container which contains a supply of carbon dioxide gas. The laser generator 208 is a carbon dioxide laser which includes a carbon dioxide lasing medium container 214 and an atom exciter 216. The atom exciter 216 can include any suitable light or energy source. The gas supply unit 210 is fluidly connected to the lasing medium container 214 through one or more hoses, tubes or channels, such as the tube 215 illustrated in FIG. 8. In operation, the atom exciter 216 energizes the carbon dioxide gas atoms, causing the atoms to move to an excited energy state. When returning from their excited states to lower states, these atoms emit light energy or photons, and the laser generator 208 directs a plurality of these photons toward an outlet. An energy stream or laser beam flows from this outlet. The laser beam, in one embodiment, is monochromatic, coherent and directional.

The energy device 202 outputs the energy stream in the form of a continuous sequence of pulses of energy. Each beam pulse is separated in time from one another, and each beam pulse includes a separate packet of energy or laser light. Put another way, each pulse includes a relatively short stream of energy or a relatively short laser beam.

In one embodiment, the control unit 212 of the energy device 202 includes circuitry or a processor which causes the laser generator 208 to output laser beams in a continuous sequence of pulses. This type of energy generator 208, sometimes referred to as a pulsed laser, periodically excites the carbon dioxide gas to generate strobe light or periodic pulses of laser packets. In one example, this type of energy generator 208 is a pulsed Transverse Electrical excitation at Atmospheric pressure (TEA) $CO_2$ laser operable to generate laser energy of approximately two-tenths to three-tenths Joules at an approximate ten and six-tenths Micron wavelength and an approximate twelve by twelve millimeter profile. In another embodiment, the energy device 202 includes a pulse assembly positioned adjacent to the outlet of the energy generator 208. The pulse assembly includes a blocker or chopper which is driven by a motor. The chopper rotates to periodically block a continuous energy stream output by the energy generator 208. As a result, the chopper causes the energy device 202 to output energy beams or laser beams in a continuous sequence of pulses. It should be appreciated that other methods and mechanisms can be used to form a series of energy pulses or beam pulses.

With continued reference to FIG. 3, the output assembly 206, in one embodiment, includes: (a) a beam expander 218 which receives each of the beam pulses from the energy device 202 and which also expands the profile of the beam within the beam pulse; (b) an image control device 220 which receives the expanded beam and manipulates that beam to define an image; and (c) a turning mirror or beam director 222 which receives one or more beams from the image control device 220 and directs the received beam pulses toward a focus lens, focus mirror or beam focuser 224 which, in turn, directs the focused beams toward the object 16. The beam expander 218, in one example, expands the cross section profile of the laser pulse by approximately five times producing a beam with a cross section of an approximate sixty by sixty millimeter profile.

Figure 4:
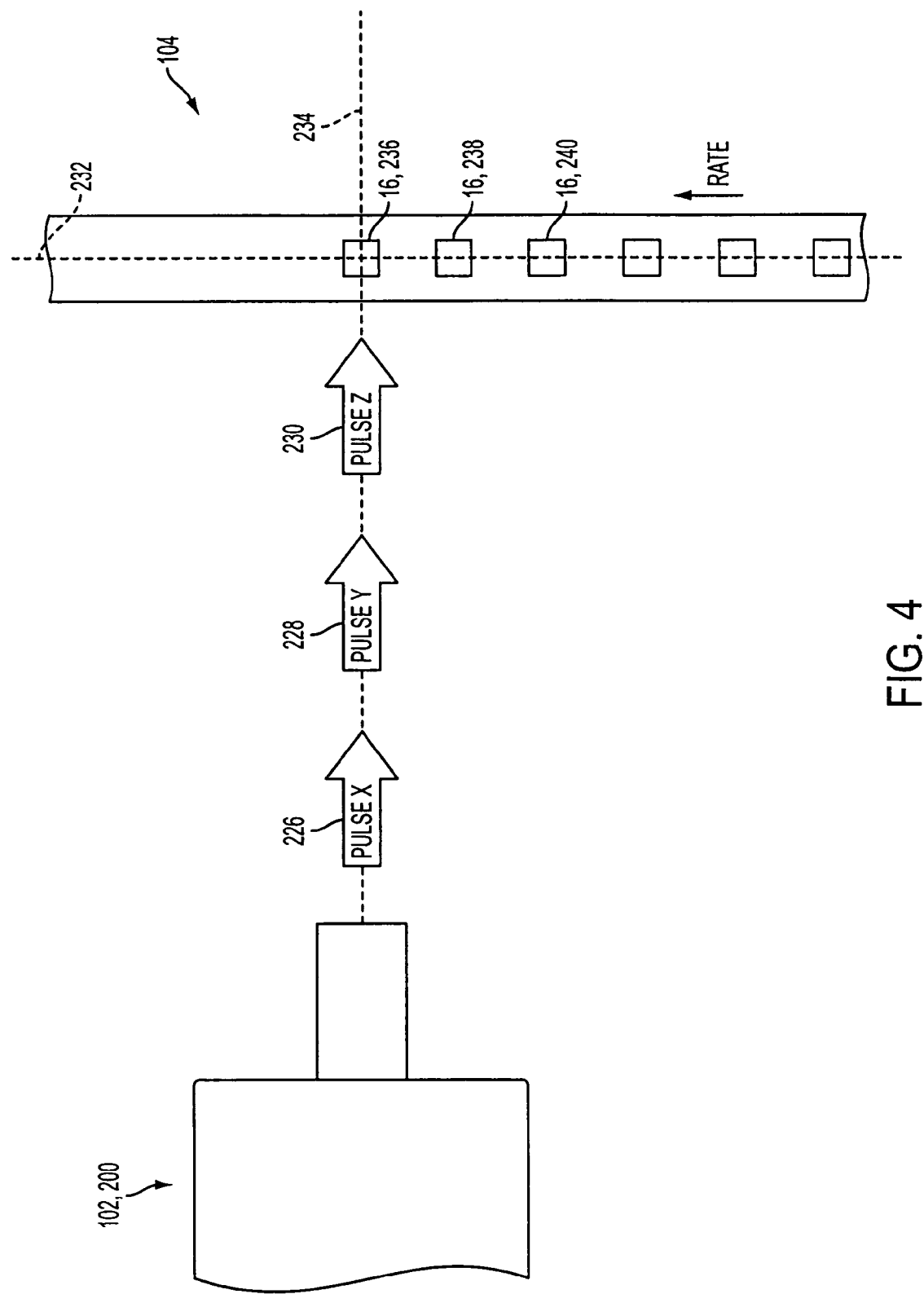
FIG. 4 is a top or plan view of one embodiment of the image former and the conveyor, illustrating an example of the image former outputting three separate energy pulses toward the conveyor.
Figure 5:
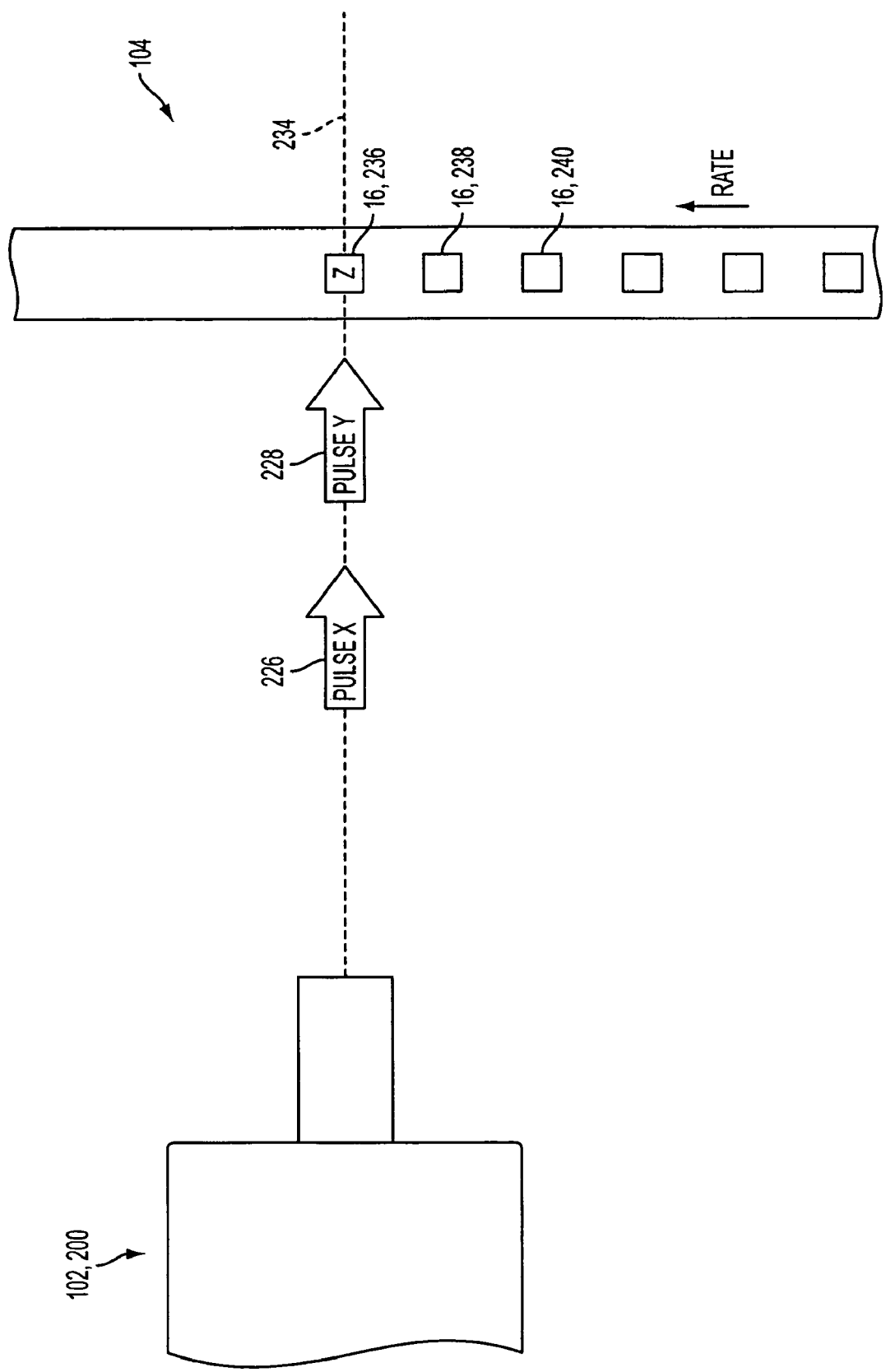
FIG. 5 is a top or plan view of one embodiment of the image former and the conveyor, illustrating one of the energy pulses of FIG. 4 having formed an image in one of the moving objects.
Figure 6:
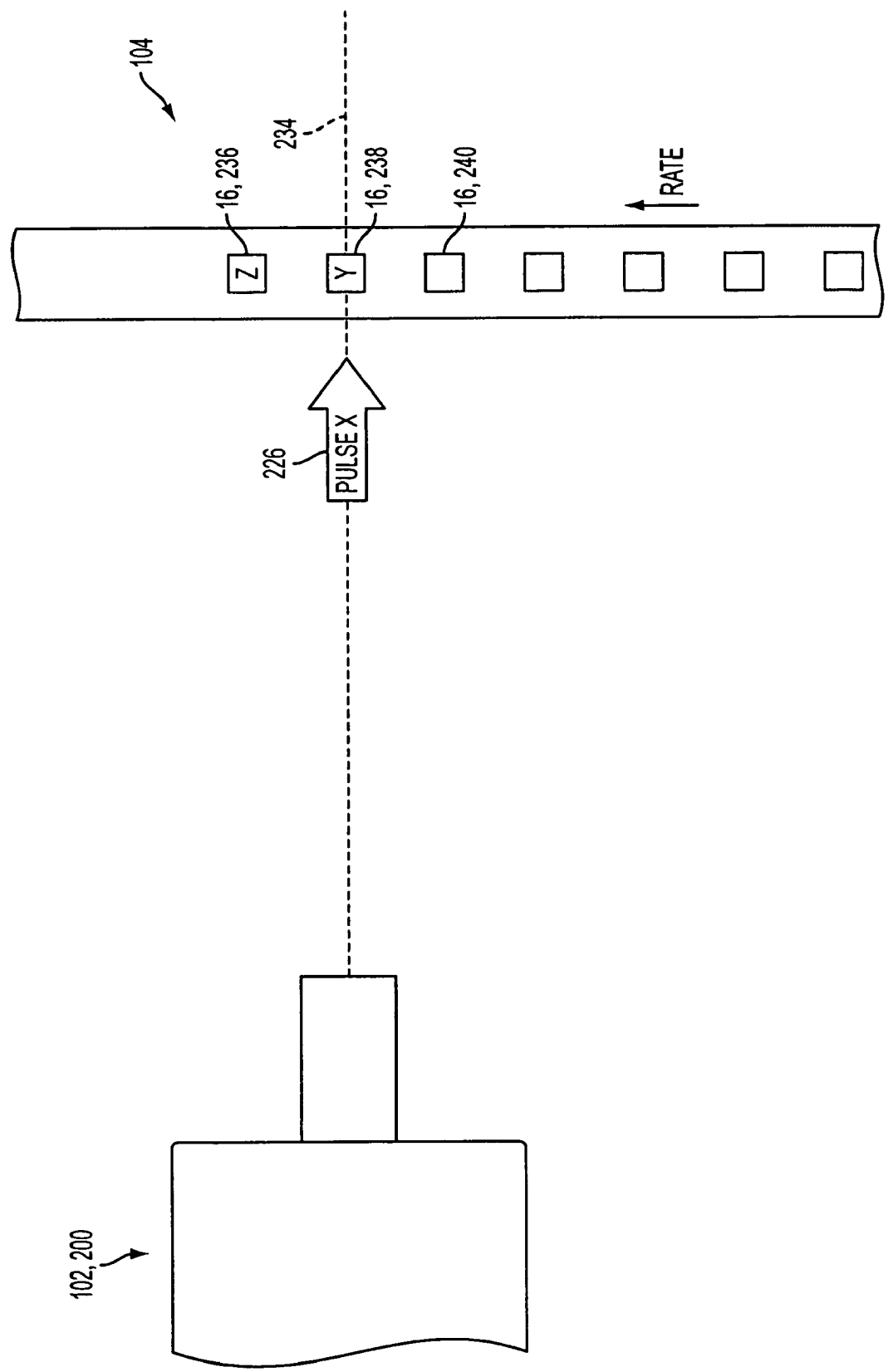
FIG. 6 is a top or plan view of one embodiment of the image former and the conveyor, illustrating another one of the energy pulses of FIG. 4 having formed an image in another one of the moving objects.
Figure 7:
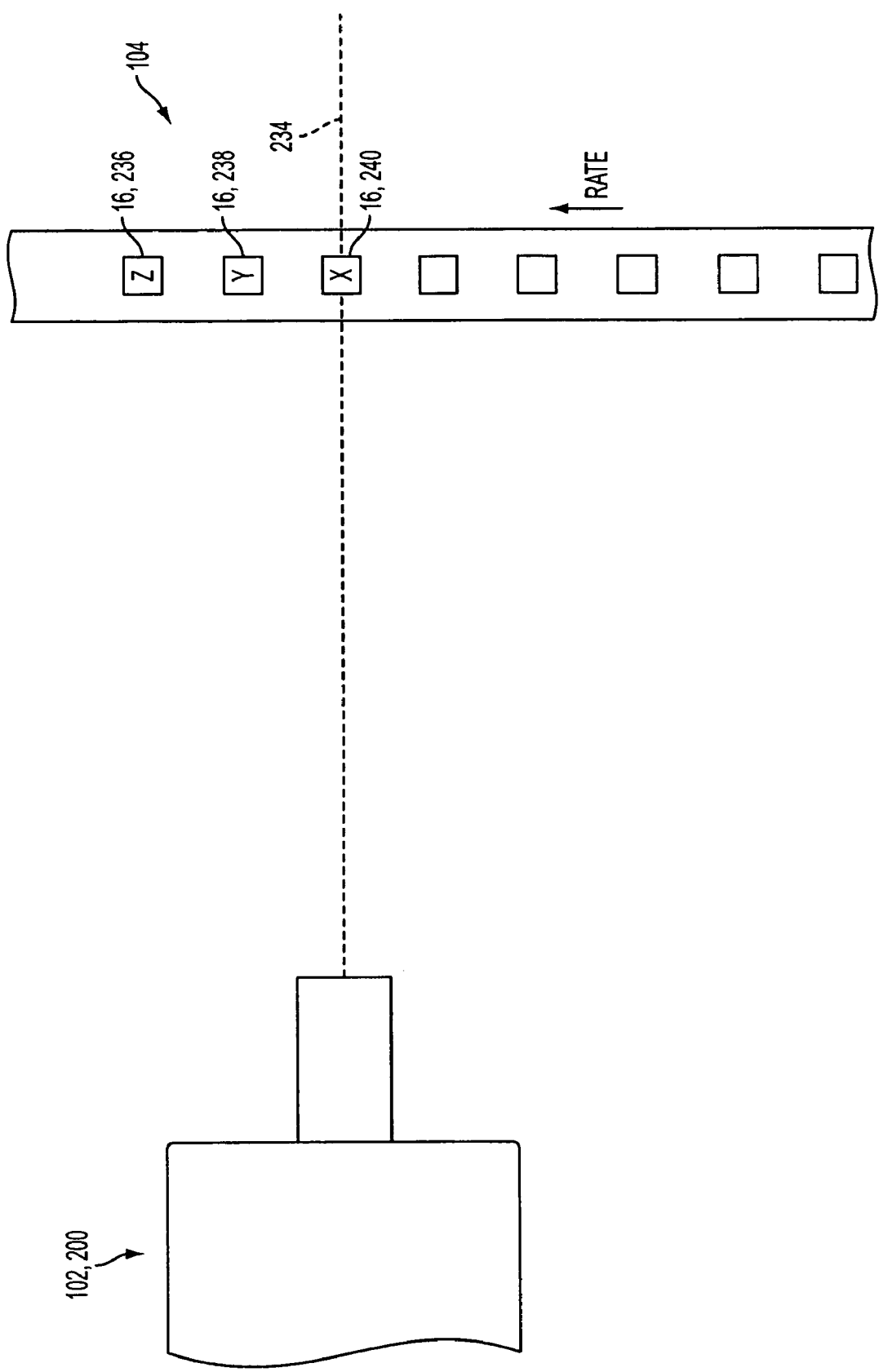
FIG. 7 is a top or plan view of one embodiment of the image former and the conveyor, illustrating yet another one of the energy pulses of FIG. 4 having formed an image in yet another one of the moving objects.

In one example illustrated in FIGS. 4 through 7, the image forming device 200 generates a plurality of laser pulses 226, 228 and 230. Each of the laser pulses 226, 228, 230 is generated at a different period in time and consequently, as illustrated in FIG. 4, these pulses 226, 228 and 230 travel separately toward the conveyor 104. At the same time, the conveyor 104 moves the objects 16 along the path 232 at a designated rate or velocity. The frequency of the pulses 226, 228 and 230 is set so that a pulse reaches the object path 232 at the time when an object 16 reaches the image path or beam path 234. In the example illustrated in FIGS. 4 and 5, pulse 230 struck object 236 while the object 236 was traveling forward through beam path 234, and pulse 230 formed an image Z on the object 236. In the example illustrated in FIGS. 5 and 6, pulse 228 struck object 238 while object 238 was traveling and passing through beam path 234, and pulse 228 formed an image Y on object 238. In the example illustrated in FIGS. 6 and 7, pulse 226 struck object 240 while the object 240 was traveling through the beam path 234, and the pulse 226 formed image X on object 240. In this embodiment, the image system 12 includes a conveyor 104 that continuously moves the objects 13 for increased processing efficiency. It should be appreciated, however, that in other embodiments, the conveyor 104 can stop each object 13 for a designated amount of time while a beam pulse forms on image on the non-moving object 13.

Figure 8:
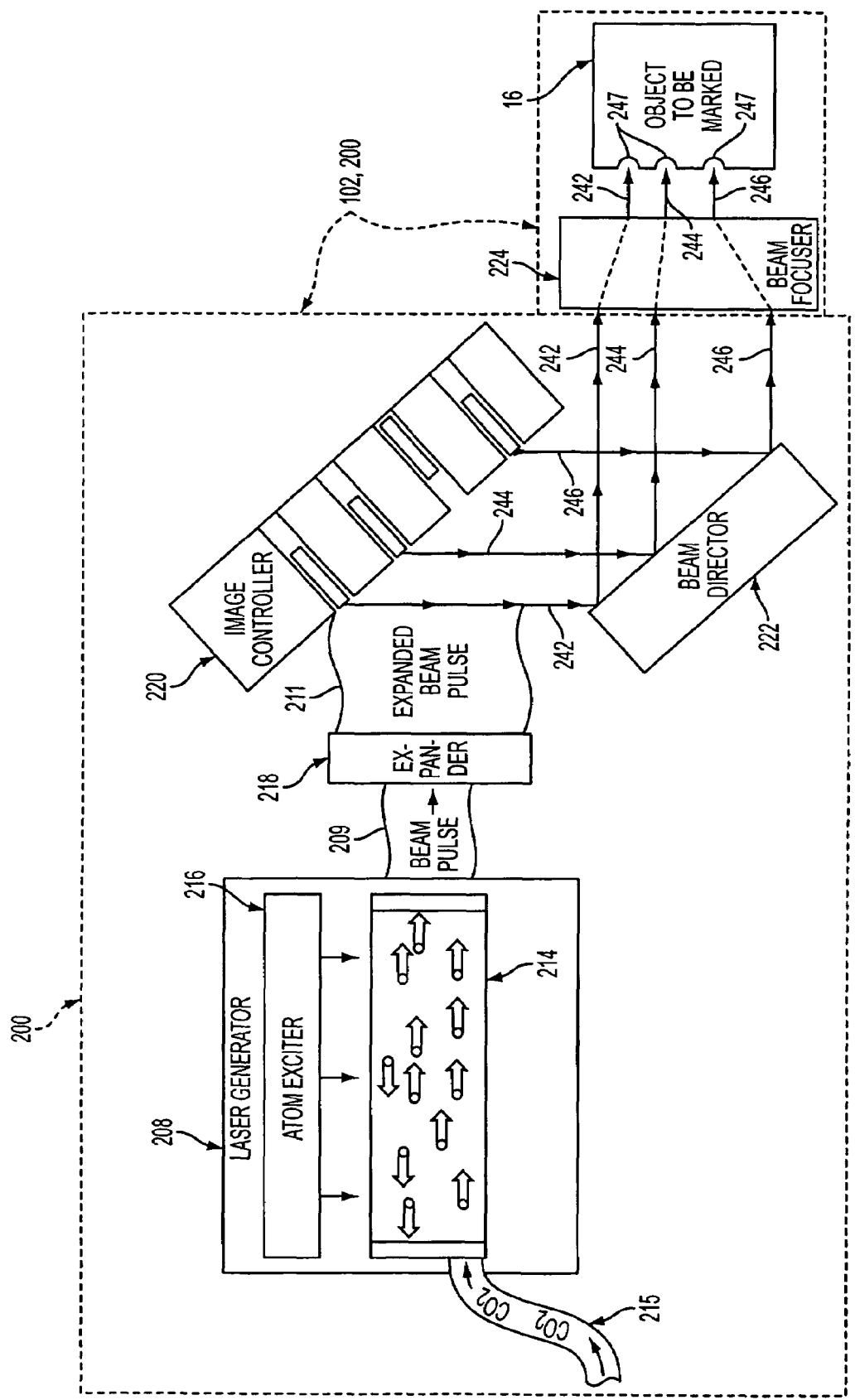
FIG. 8 is a schematic, diagrammatic view of one embodiment of the image former illustrating the flow of coherent energy from the laser generator to the object to be marked.

In one embodiment illustrated in FIG. 8, the laser generator 208 generates a beam pulse 209 which is received by the beam expander 218. The beam expander 218 expands the beam pulse 209, and the expanded beam pulse 211 is directed or otherwise travels toward the image controller or image control device 220. The image control device 220, described in greater detail below, selectively directs certain portions of the expanded beam pulse 211 toward the beam director 222. In the illustrated example, the image control device 220 absorbs or otherwise dissipates a certain portion of the expanded beam pulse 211 and reflects separate beams 242, 244 and 246 to the beam director 222. The beam director 222 directs beams 242, 244 and 246 toward the beam focuser 224. The beam focuser 224 receives the beams 242, 244 and 246 and further redirects these beams, bringing them closer to one another. The focused beams 242, 244 and 246 then strike the object 16. In the illustrated example, each of these beams 242, 244 and 246 forms a separate cavity, crevice or mark 247 in the object 16 at the same time or substantially the same time. Simultaneously striking the object 16 with separate beams 242, 244 and 246 enables the image system 12 to form an image in the object 16 with a relatively quick snap-shot process.

Figure 9:
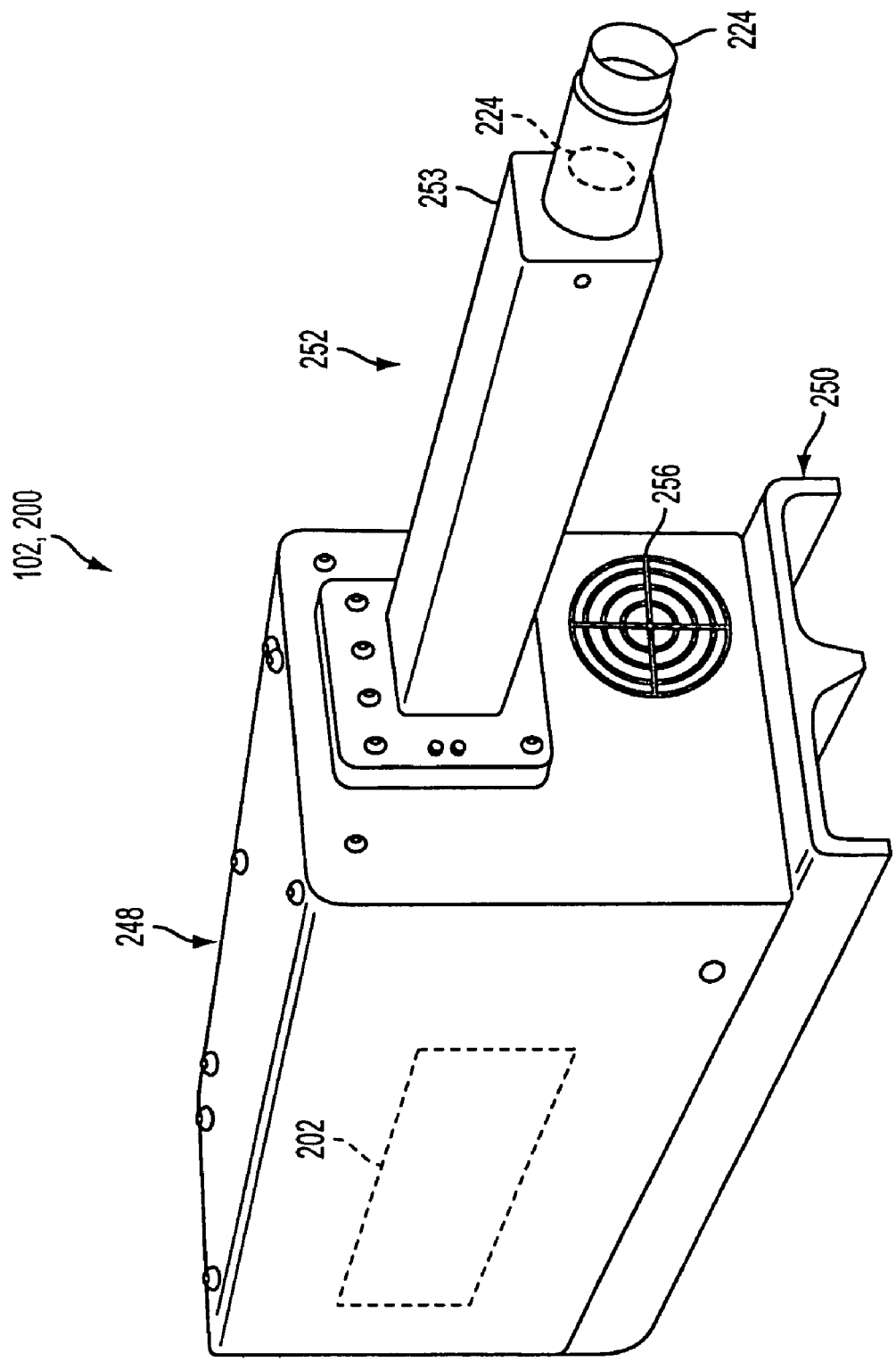
FIG. 9 is a front perspective view of one embodiment of the image former.
Figure 10:
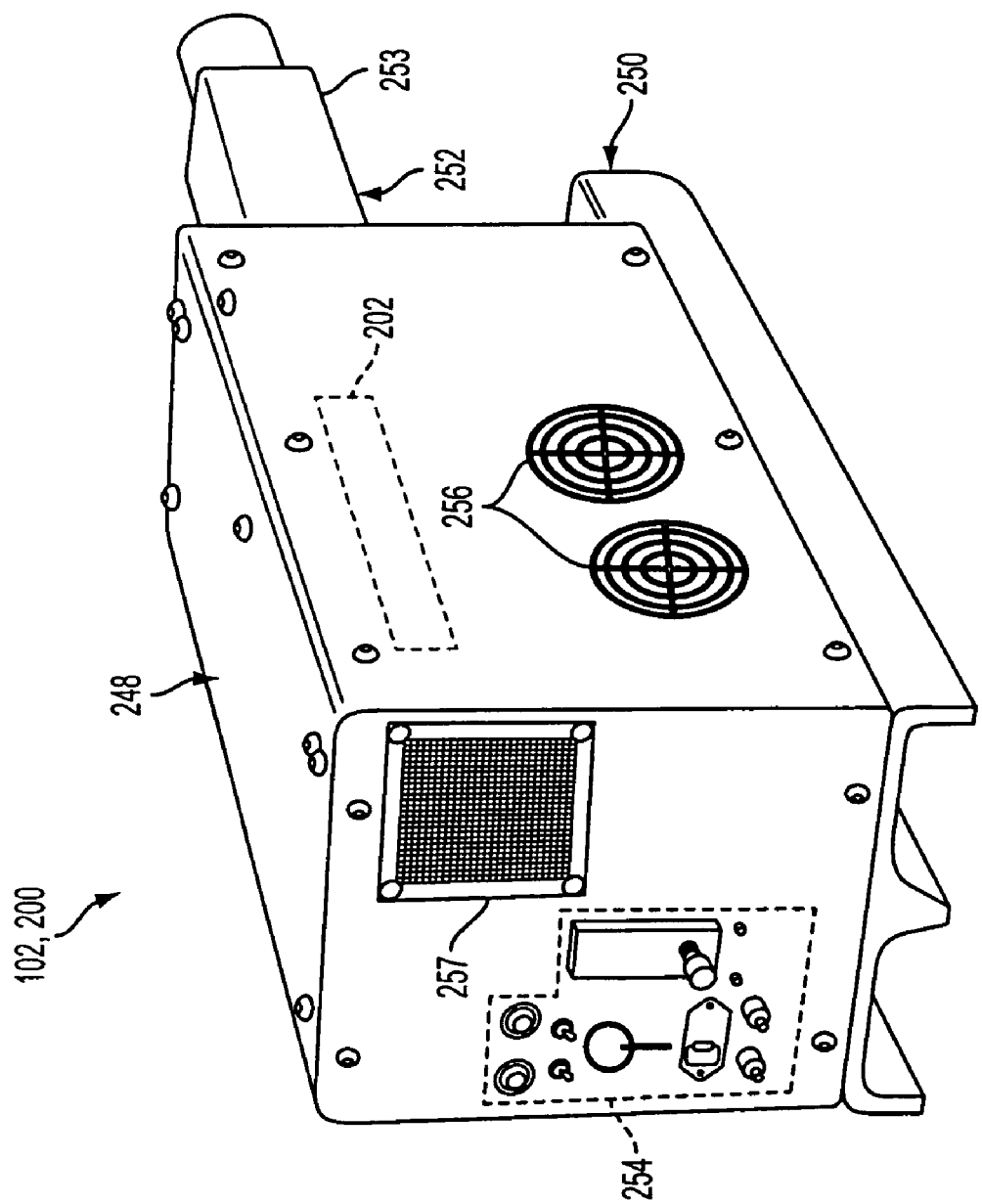
FIG. 10 is a rear perspective view of the image former of FIG. 9.
Figure 11:
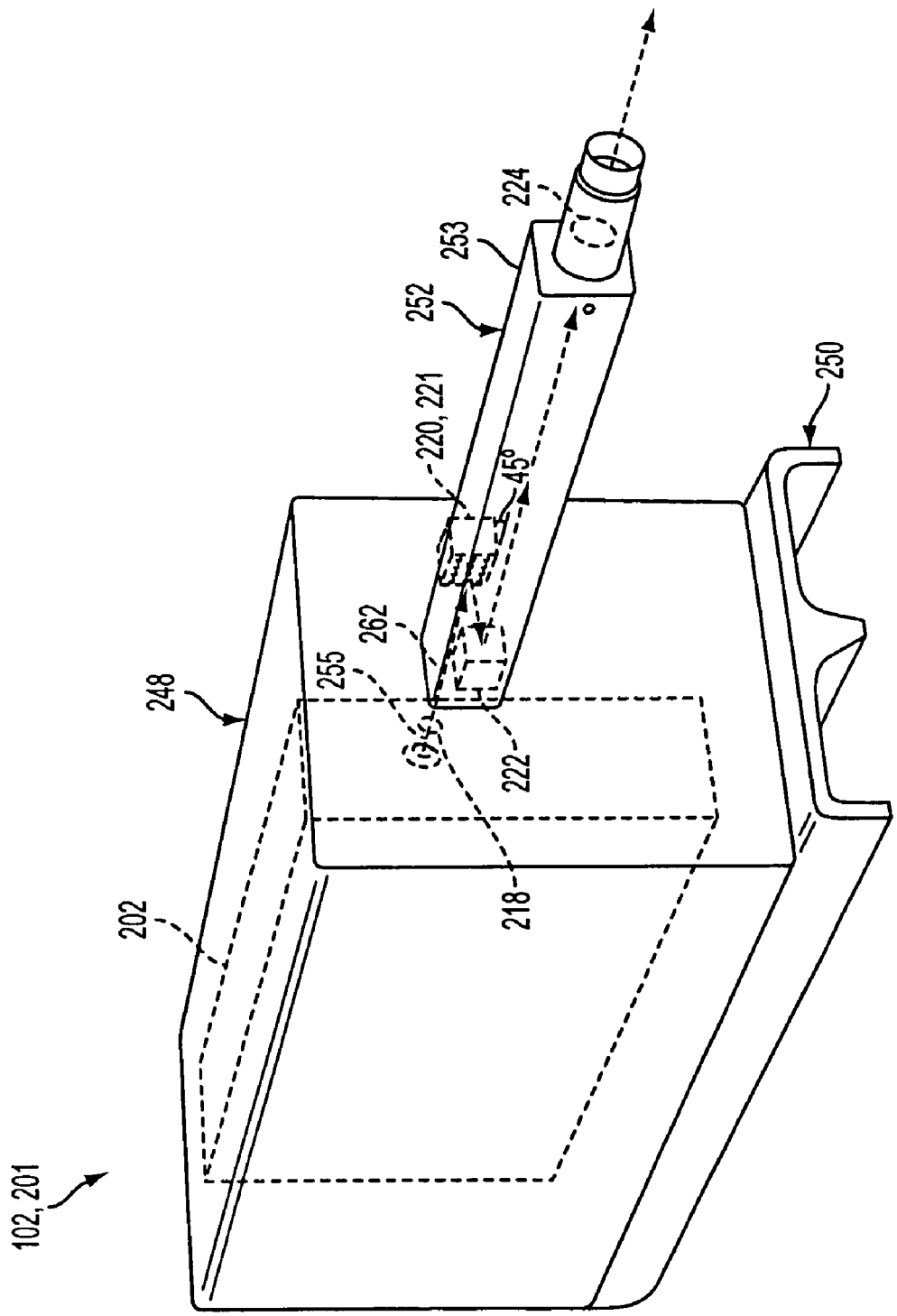
FIG. 11 is a front perspective view of one embodiment of the image former including one embodiment of the image control device.

In one embodiment illustrated in FIGS. 9 and 10, the image forming device or image former 200 includes: (a) a housing 248 which houses or otherwise supports the energy device 202; (b) a support structure, leg assembly, securing device or mount 250 which can be used to mount the image former 200 to a floor or support structure; (c) a laser shield, laser guard, barrel or arm 252 connected to the housing 248; (d) a plurality of control devices 254 used to operate and monitor the image former 200; (e) a plurality of fans 256 which cool the laser generator 208 during operation; and (f) a filtered vent 257 which outputs air forced through the vent 257 by the fans 256. The arm 252 has an extended or elongated tube with the beam focuser 224 connected to the end 253 of the arm 252. The arm 252 has a designated, permanent or adjustable, length. This length is a associated with a desired formation of the laser pulse that exits the beam focuser 224.

2.1.2 Image Control Device

Referring back to FIG. 8, the image control device 220 of the image former 200 can include any mechanical, electromechanical, electronic or computerized device (including, without limitation, a suitable beam splitter) operable to: (a) receive a beam or beam pulse; (b) selectively modify portions of that beam or beam pulse; and (c) output a modified version of that beam or beam pulse which defines or is otherwise associated with a designated image.

2.1.2.1 Dot Former

Figure 12:
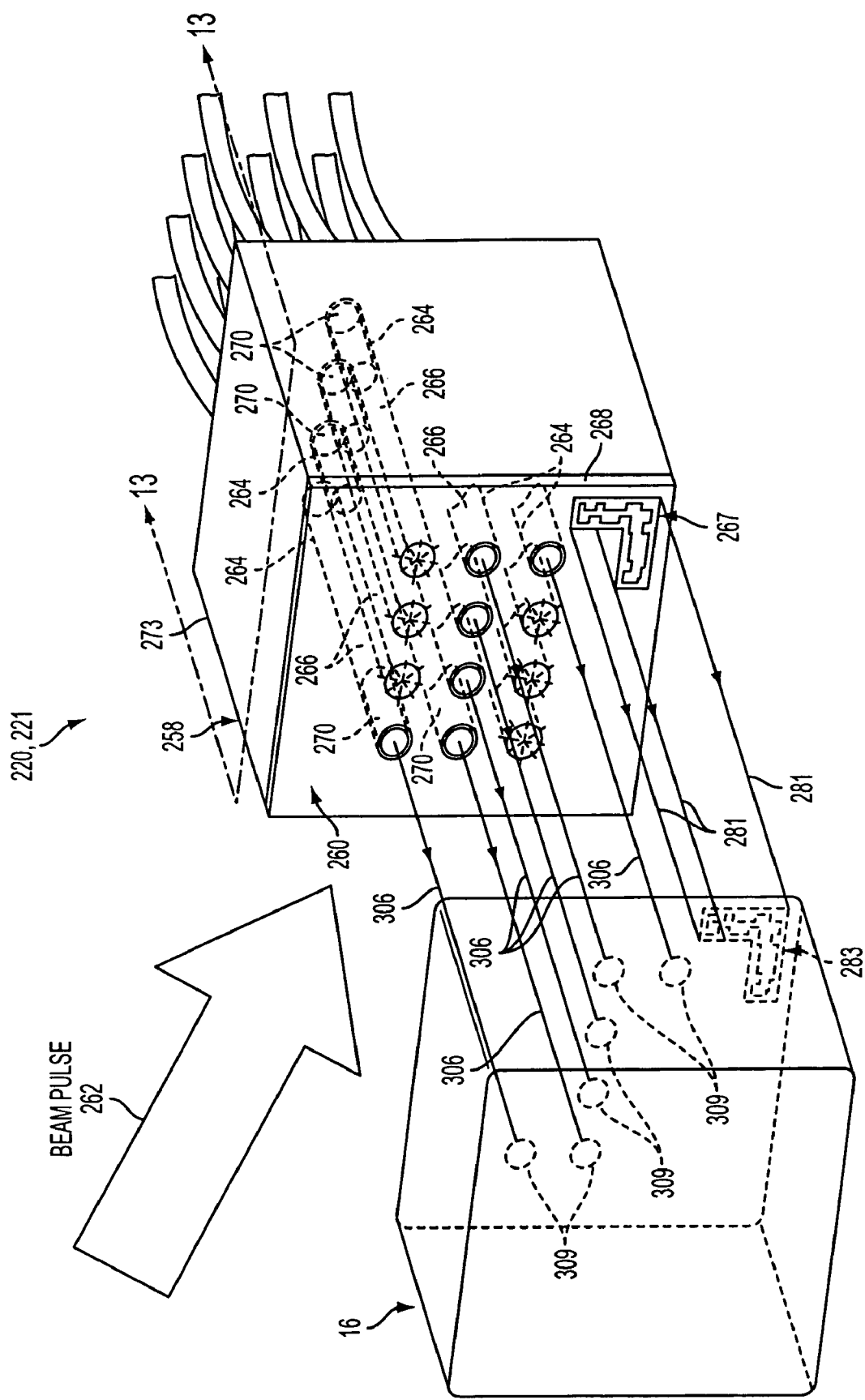
FIG. 12 is a perspective view of the image control device of FIG. 11, illustrating a beam pulse striking the image control device resulting in an array of beam pulses striking an object to be marked.
Figure 13:
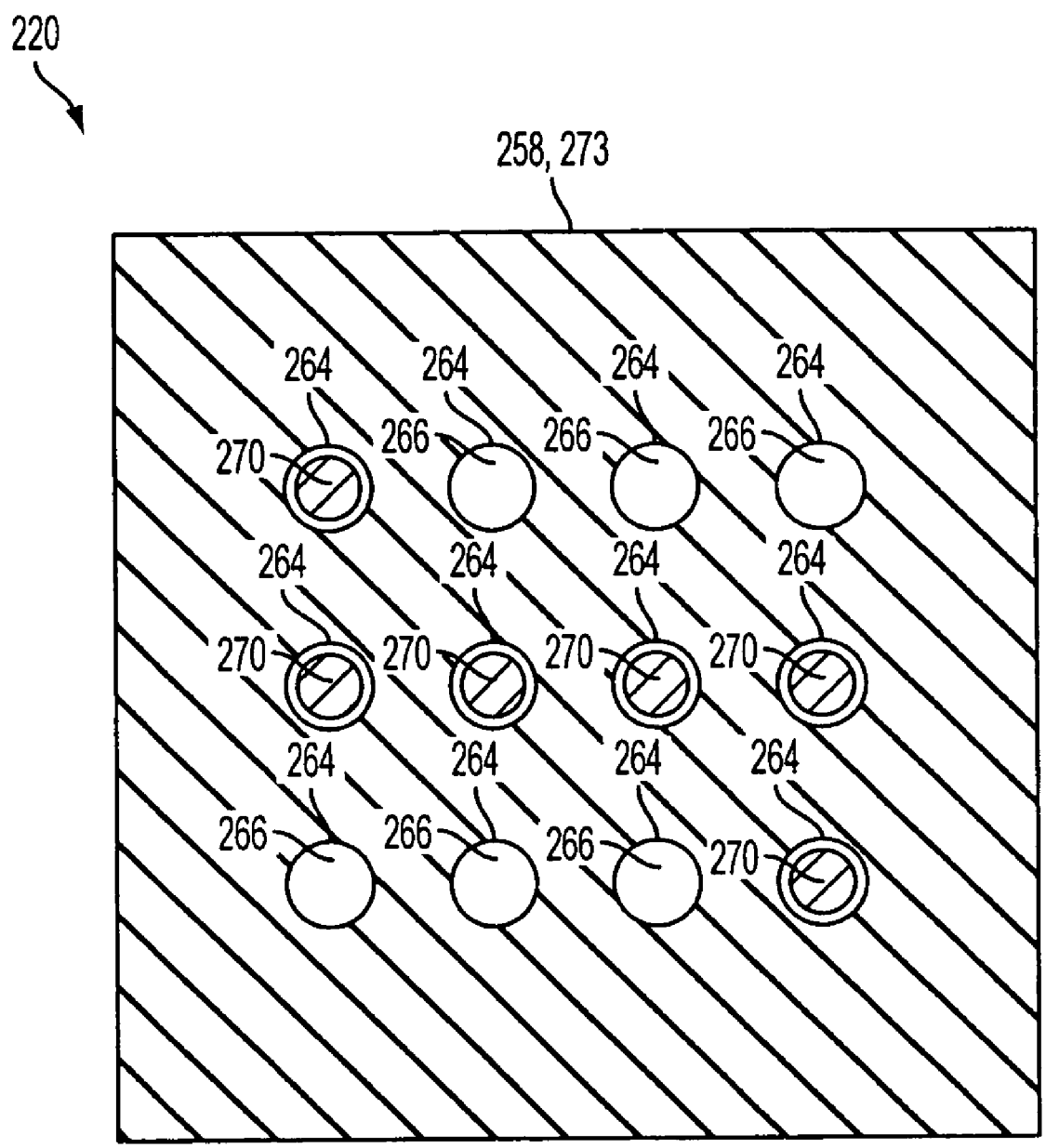
FIG. 13 is a cross-sectional side elevation enlarged view of the image control device of FIG. 12, taken substantially along line 13-13 of FIG. 12, illustrating the inner walls, cavities and movable reflectors positioned therein.
Figure 14:
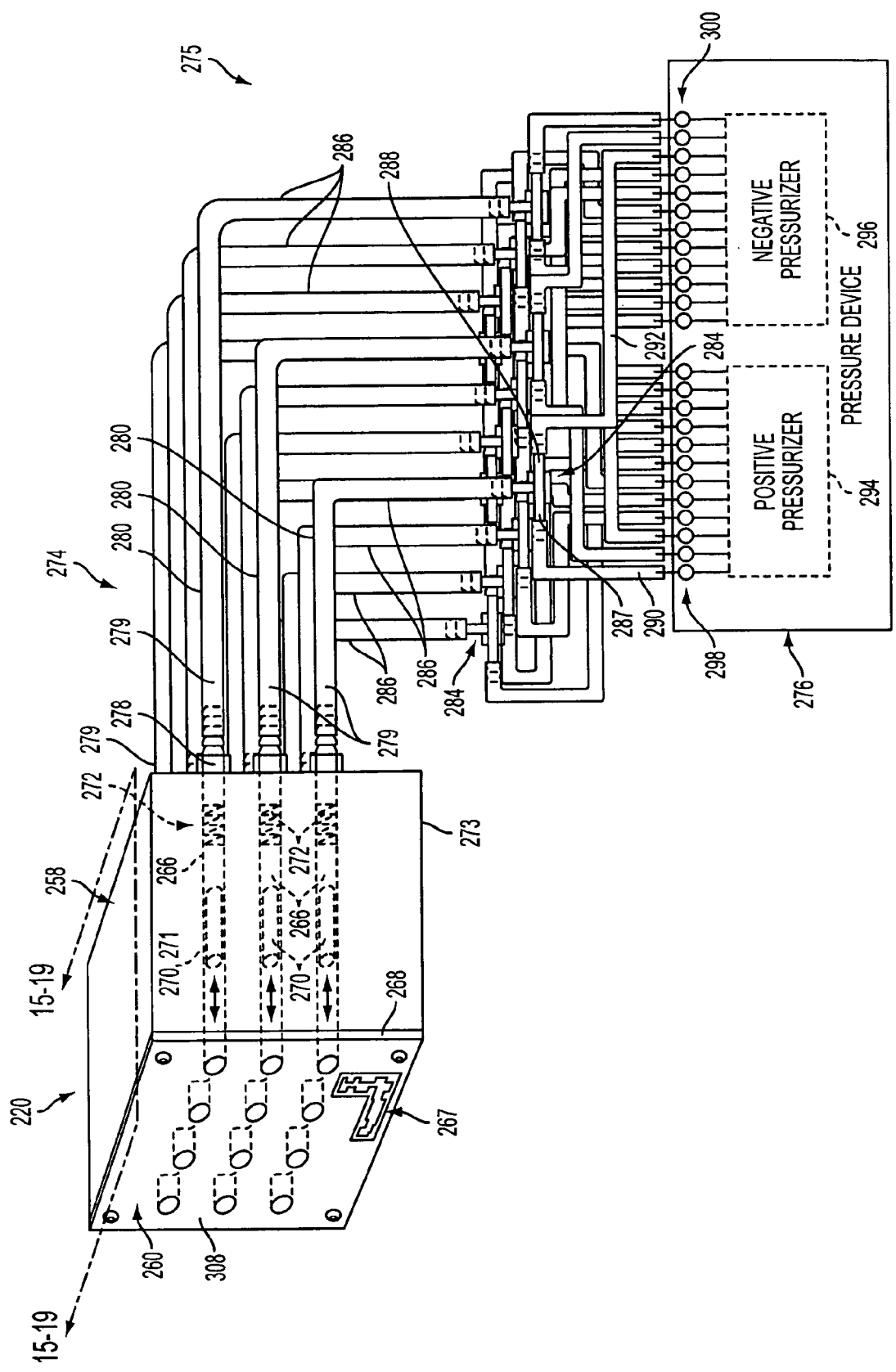
FIG. 14 is a partially perspective and partially schematic view of one embodiment of the image control device coupled to one embodiment of the actuator assembly.
Figure 15:
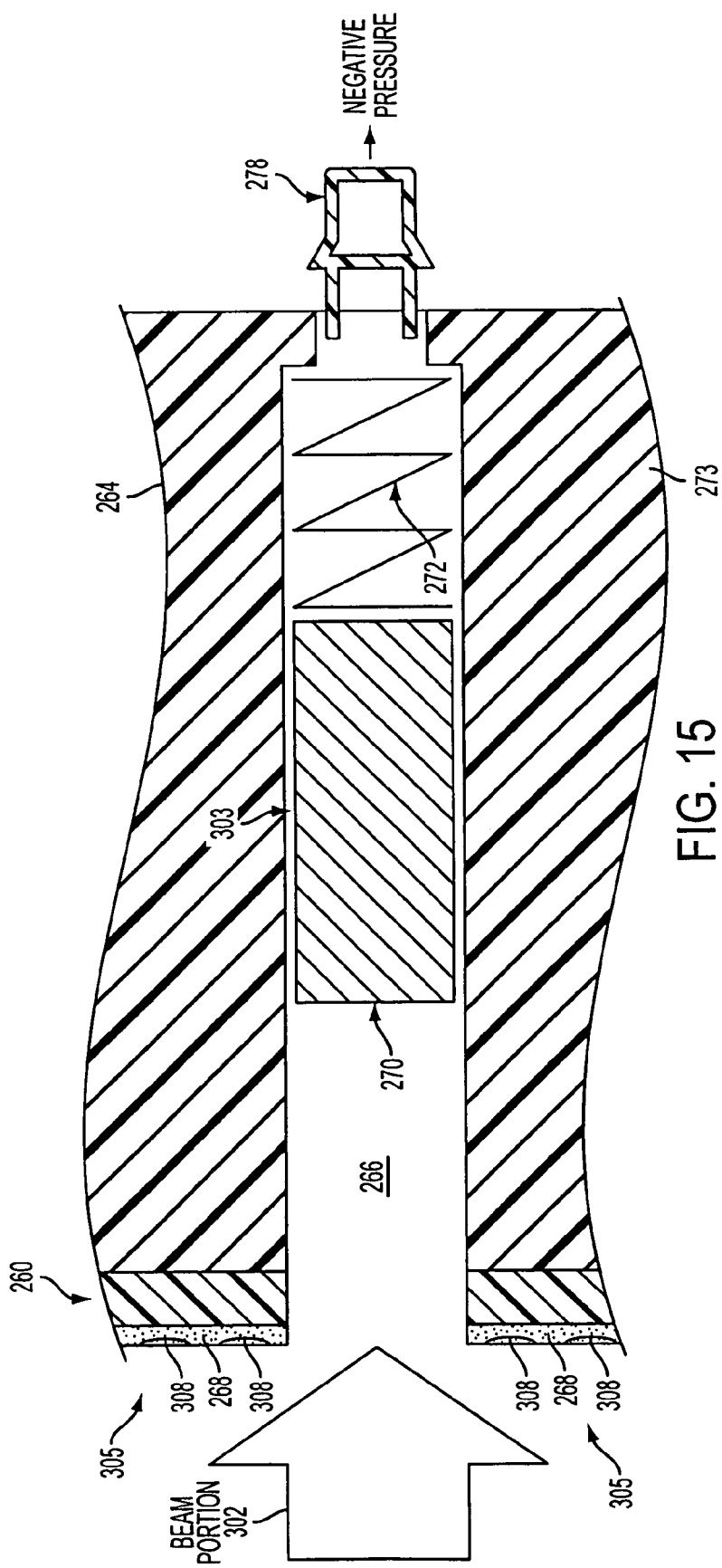
FIG. 15 is a cross-sectional side elevation view of a portion of one embodiment of the image control device of FIG. 14, taken substantially along line 15-19 of FIG. 14, illustrating an example of one of the reflectors in the non-reflect position.
Figure 16:
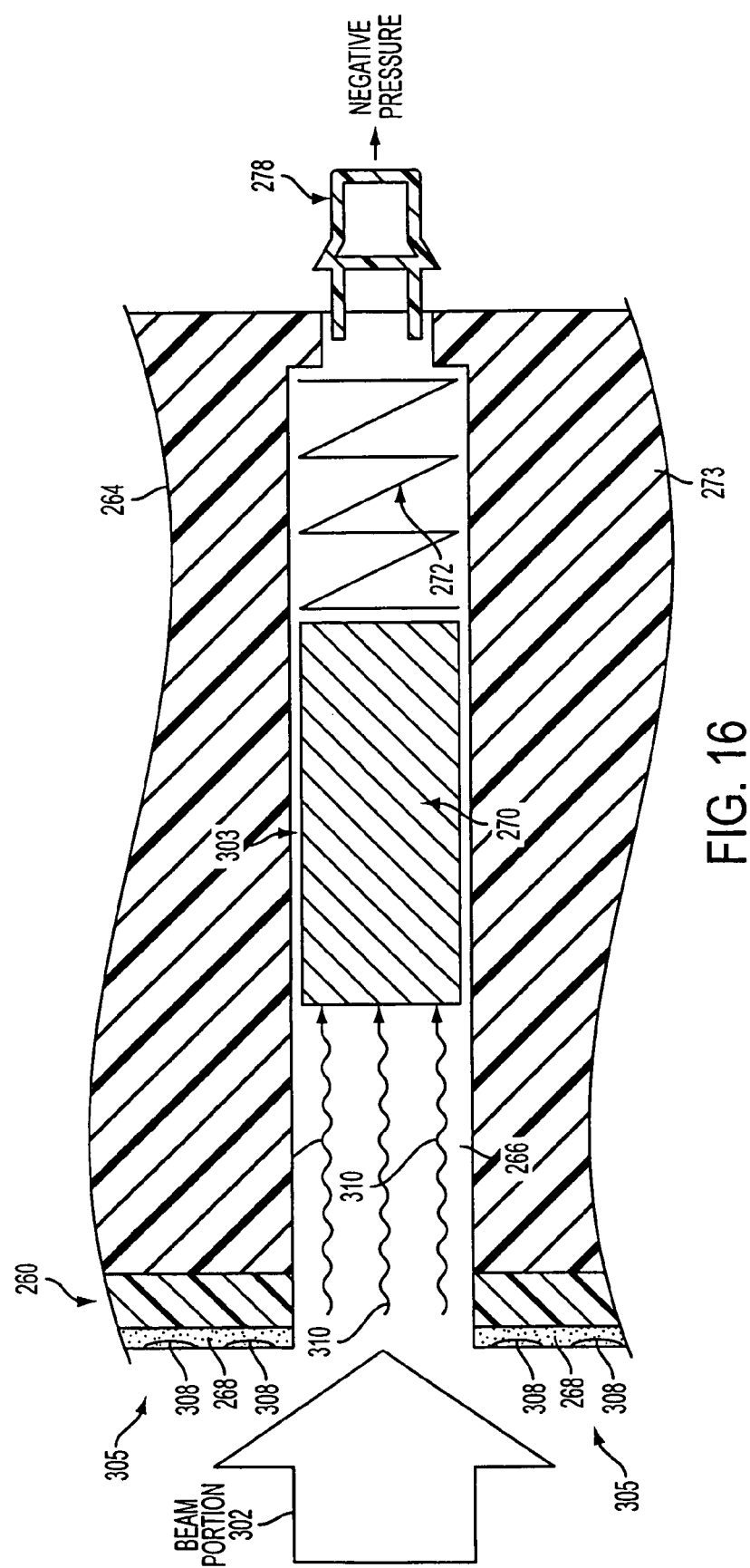
FIG. 16 is a cross-sectional side elevation view of a portion of one embodiment of the image control device of FIG. 14, taken substantially along line 15-19 of FIG. 14, illustrating the flow of laser energy into one of the cavities when one of the reflectors is in the non-reflect position.

In one embodiment illustrated in FIGS. 11 through 19, the image former 201 includes the energy device 202, beam expander 218, image control device 221 and beam director 222. The energy device 202, beam expander 218, image control device 221 and beam director 222 are positioned within the housing 248. The beam focuser 224 is positioned within the end 253 of the arm 252. The energy device 202 provides beam pulses 255 which strike the image control device 220. As best illustrated in FIGS. 12 through 14, the image control device 221 includes: (a) a body or housing 258 having a face 260 which is oriented at a suitable angle, such as a forty-five degree (45°) angle, relative to the laser generator beam axis 262; (b) a plurality of inner walls 264 which define an array of openings, channels or cavities 266; (c) an energy absorber, absorption plate or absorption surface 268 located at the exterior of the face 260; (d) a reflective mask or template 267 which is attached to the face 260 on top of the absorption surface 268; (e) a plurality of movable members, mirror segments, pistons, slugs or reflectors 270, each of which is slidably or otherwise movably lodged within one of the cavities 266; (f) a plurality of biasing members or springs 272, each of which is lodged within one of the cavities 266 near the rear end 273 of the housing 258; and (g) an actuator assembly 275 operable to independently actuate the reflectors 270.

The absorptive surface 268 can include a coating, such as paint, a fluoropolymer resin or any suitable polymer material. Alternatively, the absorptive surface 268 can include a separate plate having absorptive properties. In another alternative, the absorptive surface 268 can be the outer surface of the housing 258, where the outer surface is constructed of a material associated with an absorptive property.

In one embodiment, each reflector 270 is approximately six millimeters in diameter and eighteen millimeters in length. In the illustrated example, the image control device 221 includes twelve reflectors 270. It should be appreciated, however, that the image control device 221 can include any suitable number of reflectors 270. For example, the image control device 221 can include a ten by ten grid of one hundred reflectors 270, where each such reflector 270 is associated with a grid point or pixel for the formation of an image on the object 16.

The actuator assembly 275 includes: (a) a tubing assembly 274 attached to the rear end 273 of the housing 258; and (b) a pressure device 276 coupled to the tubing assembly 274. In one embodiment, the tubing assembly 274 includes, for each one of the cavities 266: (a) a connector 278 which fluidly connects one of the cavities 266 to one end 279 of a tube 280; and (b) a multi-branch connector or T-connector 284 connected to the other end 286 of the hose or tube 280. Each T-connector 284 has a positive pressure branch 287 and a negative pressure branch 288. The tubing assembly 274 also includes, for each one of the T-connectors 284: (a) a positive pressure tube 290 connected to the positive branch 287 and a negative pressure tube 292 connected to the negative pressure branch 288.

The pressure device 276 of the actuator assembly 275 includes a positive pressurizer 294 and a vacuum or negative pressurizer 296. The positive pressurizer 294 has a plurality of solenoid-controlled control valves 298, each of which is connected to one of the positive pressure tubes 290. Likewise, the negative pressurizer 296 has a plurality of solenoid-controlled control valves 300, each of which is connected to one of the negative pressure tubes 292. As illustrated in FIGS. 12, 15 16 and 18, when the beam pulse 262 strikes the face 260 of the image control device 220, different portions 302 of the beam pulse 262 strike different areas 305 adjacent to the different cavities 266.

Figure 17:
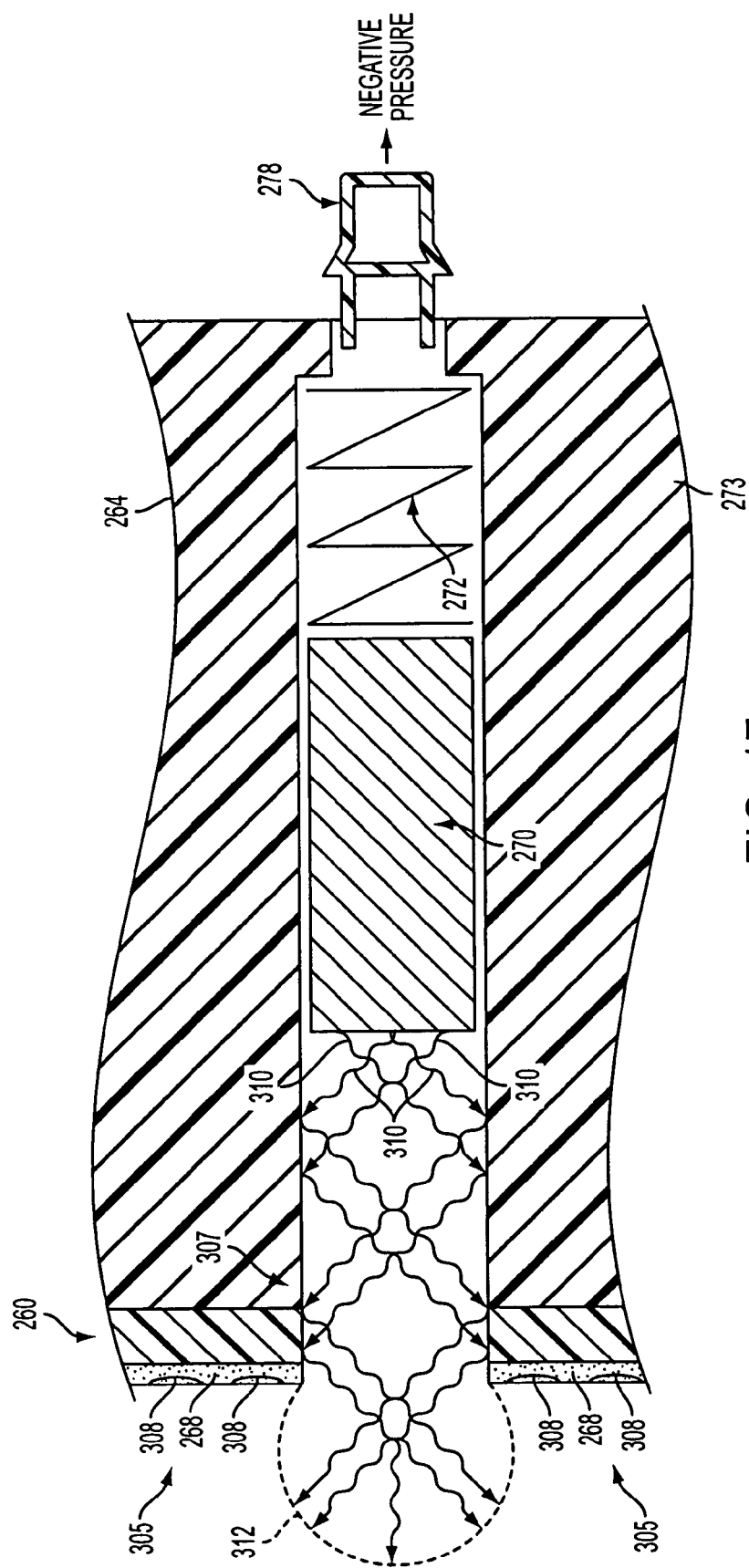
FIG. 17 is a cross-sectional side elevation view of a portion of one embodiment of the image control device of FIG. 14, taken substantially along line 15-19 of FIG. 14, illustrating the flow of laser energy from one of the reflectors when such reflector is in the non-reflect position.

By default, the pressure device 276 applies a vacuum or negative pressure to the cavities 266. The negative pressure applies a rearward force to the reflectors 270, maintaining the reflectors 270 in a non-reflect position 303 at or adjacent to the rear end 273 of the housing 258. In one example, the negative pressure is approximately eight to ten ounces. When the beam portion 302 strikes the face 260, certain energy 308 is absorbed or otherwise dissipated at the absorption surface 268 of the face 260. Other beam portions 310 of the beam portion 302 travel into the cavity 266. Once inside the cavity 266, these beam portions 310 strike the reflector 270. As illustrated in FIG. 17, the reflector 270 reflects these beam portions 310 back toward the front end 307 of the image control device 221. As a result of the geometry and dimensions of the cavities 266, these beam portions or light particles 310 exit the cavity 266 in a relatively incoherent form 312. Having a relatively incoherent characteristic or property, this light energy is relatively weak and diffuse, and, as a result, does not reach the object 16 with sufficient strength to form a significant or detectable cavity, image or mark on the object 16. Therefore, in default mode, the image control device 221 does not output any laser beams.

Figure 18:
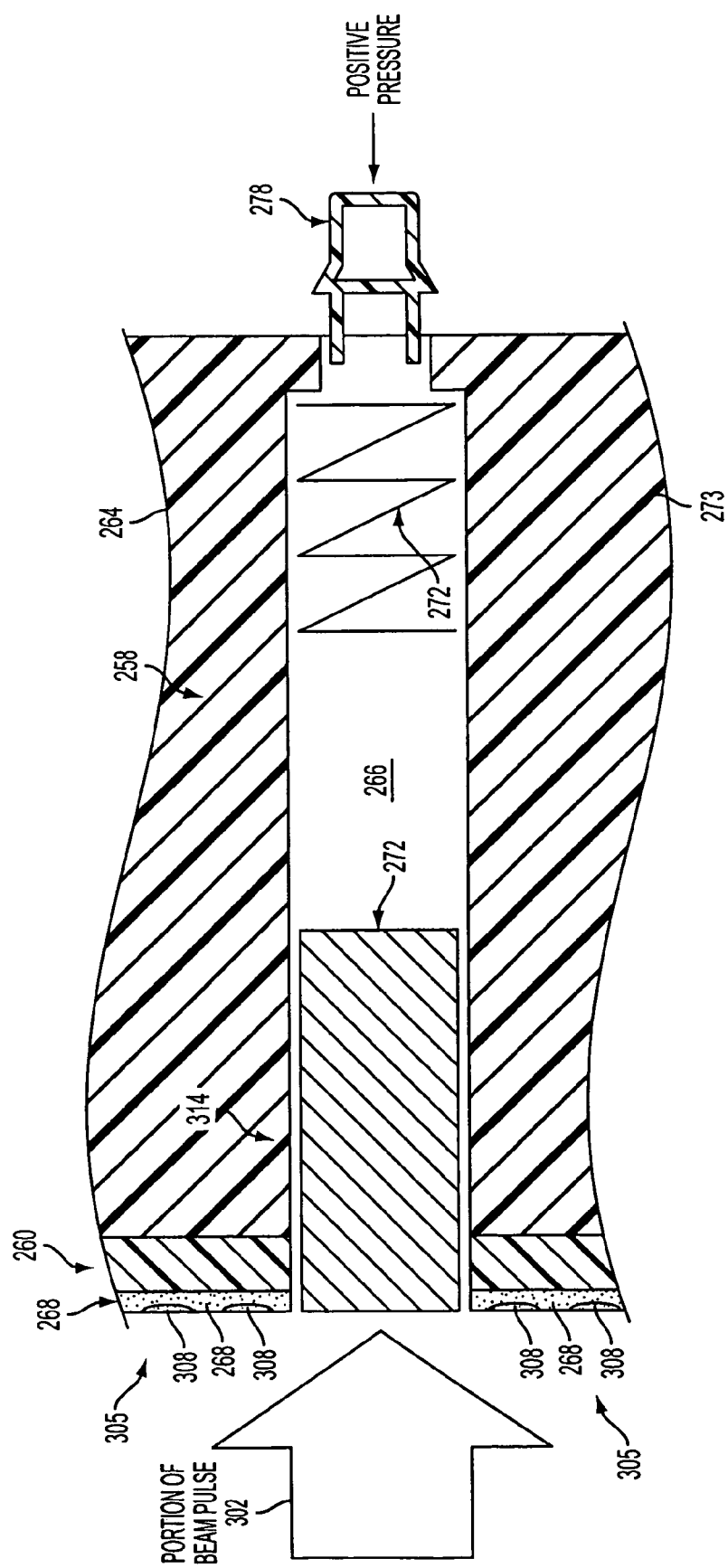
FIG. 18 is a cross-sectional side elevation view of a portion of one embodiment of the image control device of FIG. 14, taken substantially along line 15-19 of FIG. 14, illustrating an example of one of the reflectors in the reflect position.
Figure 19:
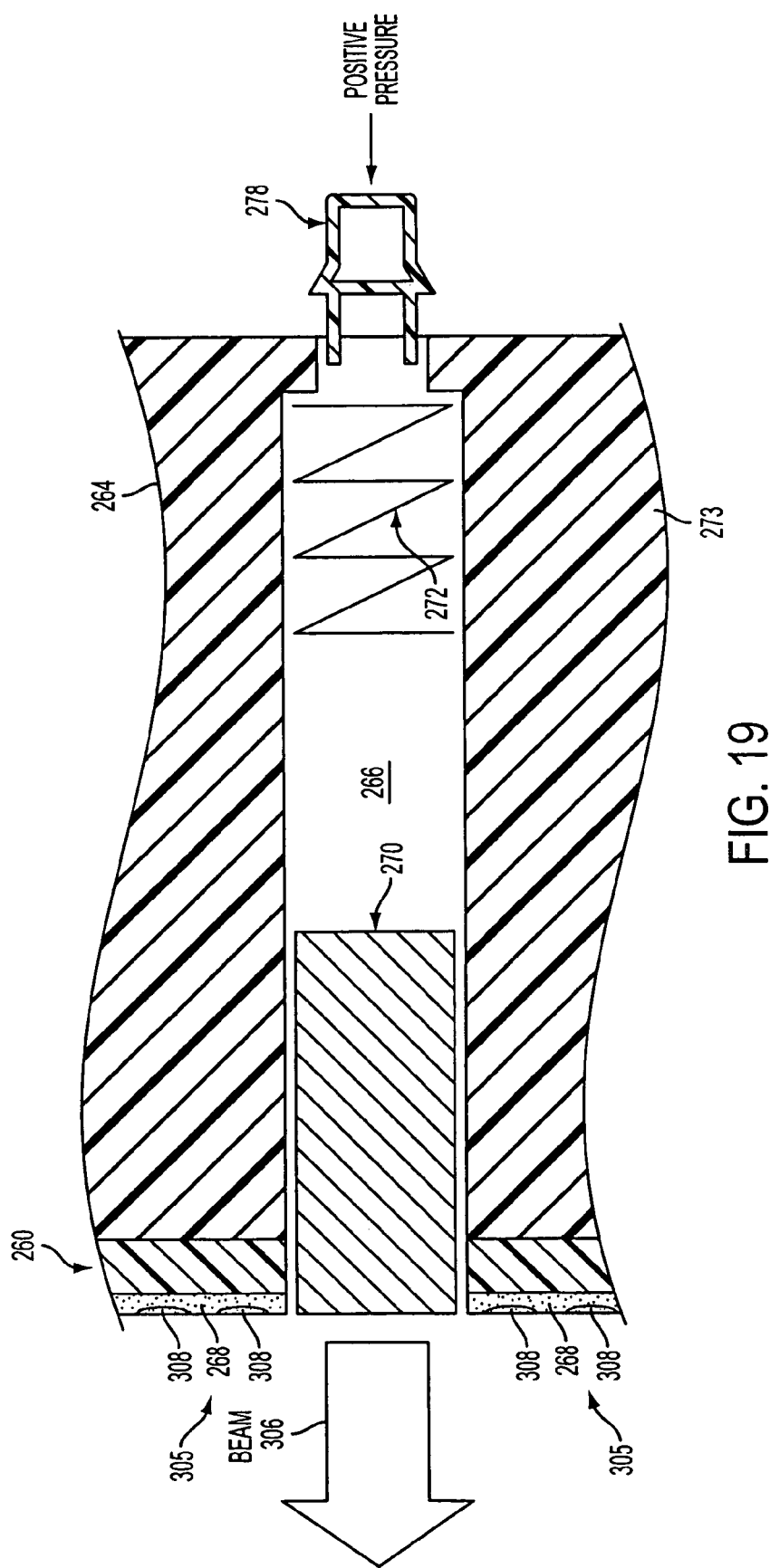
FIG. 19 is a cross-sectional side elevation view of a portion of one embodiment of the image control device of FIG. 14, taken substantially along line 15-19 of FIG. 14, illustrating the flow of laser energy from one of the reflectors when such reflector is in the reflect position.
Figure 20:
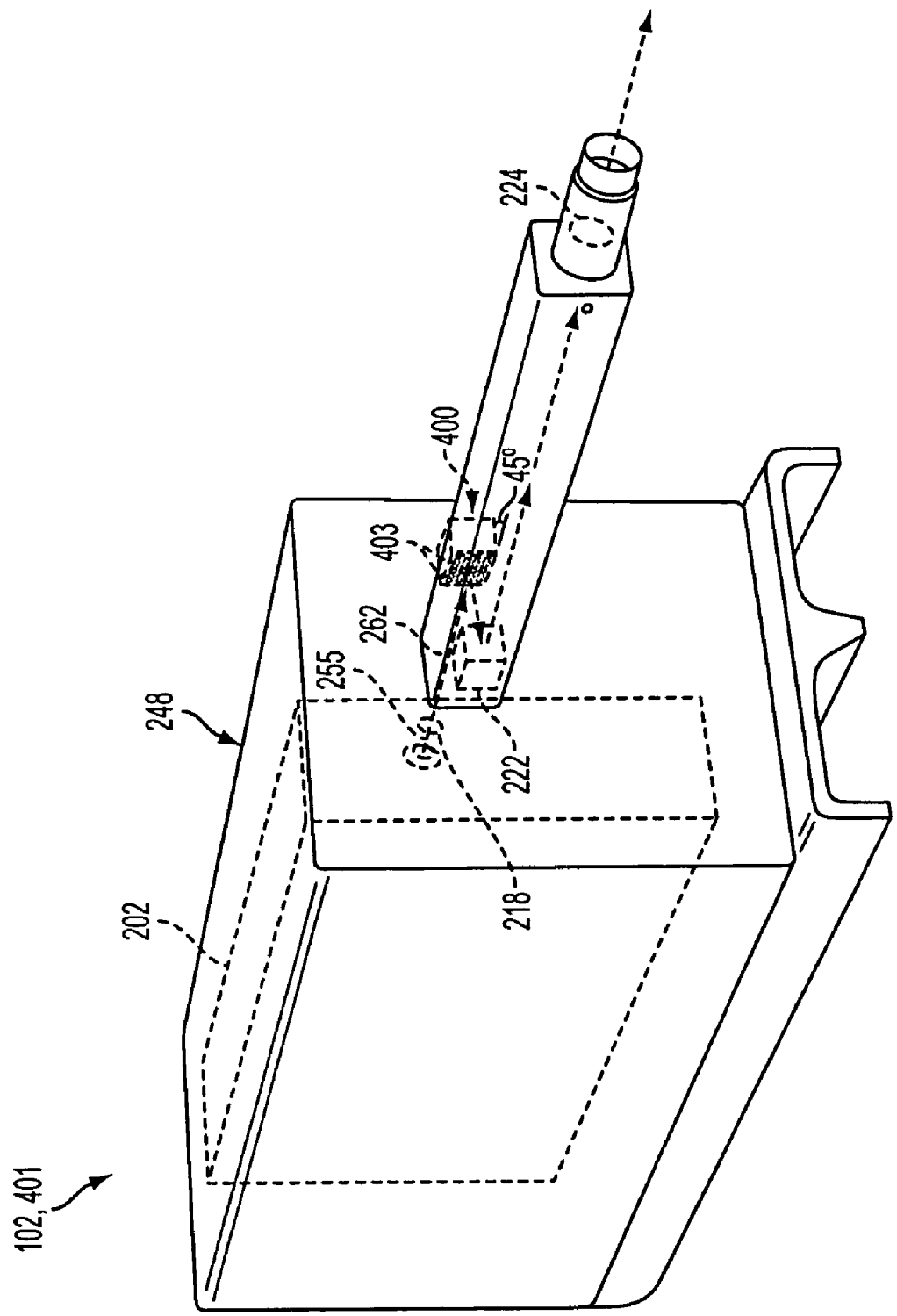
FIG. 20 is a front perspective view of one embodiment of the image former including another embodiment of the image control device.

When the image control device 221 is switched to image mode, the image control device 221 causes select reflectors 270 to move to a reflect position 314 in accordance with designated programming instructions, as illustrated in FIGS. 18 and 19. The pressure device 276 applies a positive pressure to the cavity 266. This positive pressure moves the reflector 270 forward and maintains it at the reflect position 314 at or adjacent to the face 260. In one example, the positive pressure is approximately four ounces. In this reflect position 314, as illustrated in FIG. 19, certain energy 308 is dissipated or otherwise absorbed by the absorption surface 268 of the face 260. At about the same time, a beam portion or sub-beam 306 is reflected from the reflector 270. This sub-beam 306 is relatively coherent, and, accordingly, has sufficient strength to reach the object 16 and form a cavity mark 309 on the object 16, as illustrated in FIG. 12. In this example, the sub-beams 306 form a partially dot matrix pattern of holes, cavities or marks 309 on the object 16.

If all of the reflectors 270 were to have the reflect position 314, the image control device 220 would form an entire grid, array or matrix of dots on the object 16. To form different images on the different objects 16, the image control device 220 varies the positions of the reflectors 270. In operation, the actuator assembly 275 cycles the reflectors 270 at a relatively high cycle rate, for example, seventy-five to one hundred cycles per second. Referring back to FIG. 14, an image or code may, for example, be associated with a reflector arrangement where reflector 271 has the reflect position, and a different image or code may be associated with a reflector arrangement where reflector 271 has the non-reflect position.

Regardless of the position of the reflectors 270, the reflective template 267, in one embodiment, constantly reflects a beam portion 281 of the beam pulse 262, and the beam portion 281 strikes the object 16. The shape of the reflective template 267 determines the shape of the beam portion 281 which, in turn, determines the shape of the image 283 formed on the object by the template 267. In one embodiment, the template 267 has a designated shape associated with an identifier or signature of the particular image forming device 201 being used. In one example not illustrated, the reflective template 267 is configured to form an additional row of reflective symbols. These symbols cause an alpha-numeric serial code to be formed in the object 16. This code corresponds to the serial code of the particular image forming device 201 being used.

In another embodiment, the template 267 has a designated degradation property associated with the reflectiveness of the template 267. For example, with each reflection event, the reflectiveness of the template 267 decreases. After a certain number of reflection events, the template 267 will absorb all or substantially all of the laser beam received. As a result, the authenticity identifier or signature of the image forming device 201 will be excluded from the objects 16. This will indicate to facility operators, the need to replace the image control device 221 of the image former 201.

In one example, where a batch of products are serially marked with unique matrix codes, the image control device 221 causes the positions of the reflectors 270 to have a different orientation each time a different product is being marked. During this process, the springs 272 assist in absorbing at least part of the shock or impact generated by the backward motion of the reflectors 270. The springs 272 can decrease vibrations and damage to the integrity of the reflectors 270 and the housing 258.

2.1.2.2 Bar Former

Figure 21:
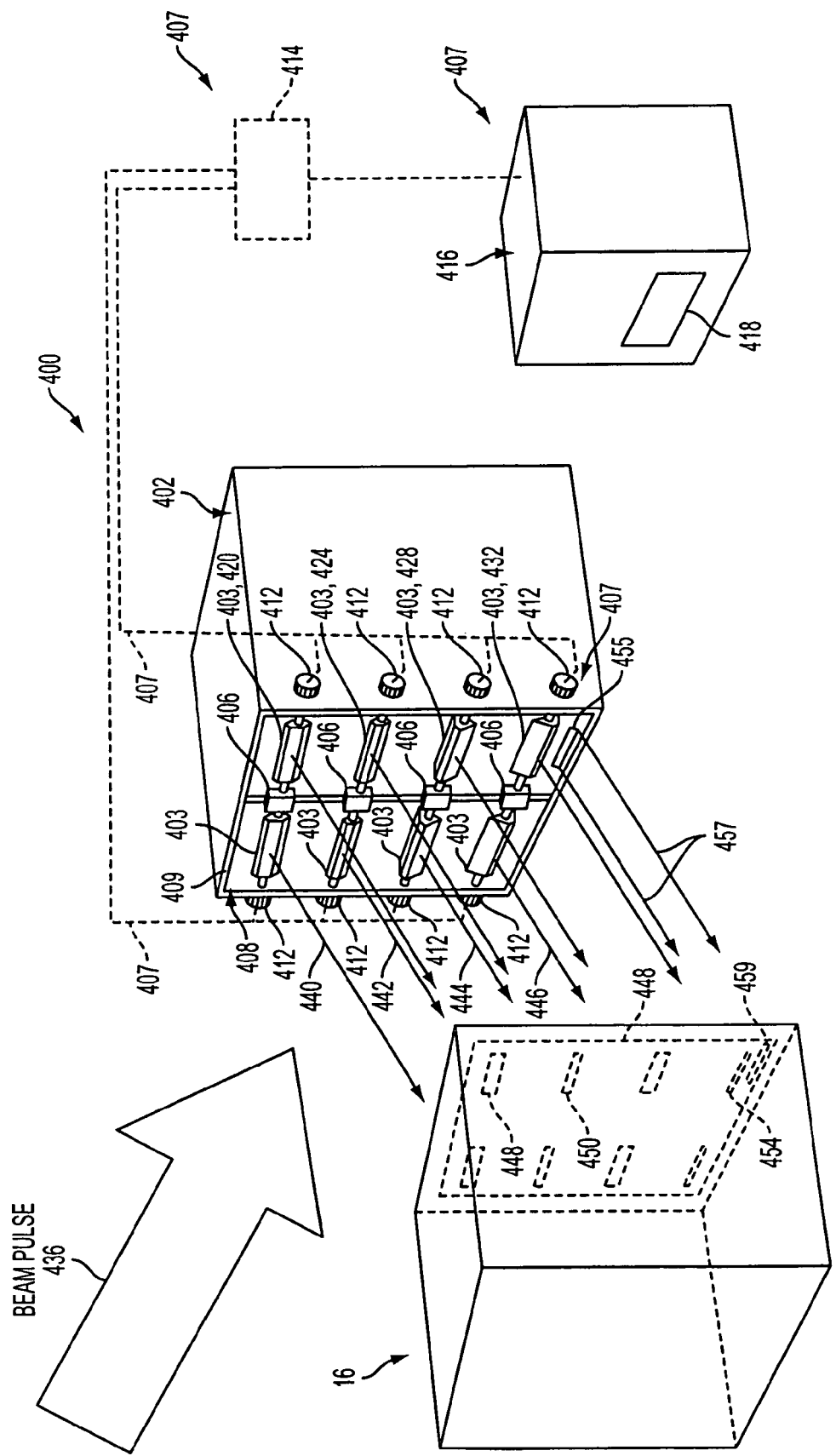
FIG. 21 is a partially perspective view and schematic view of another embodiment of the image control device coupled to another embodiment of the actuator assembly.
Figure 22:
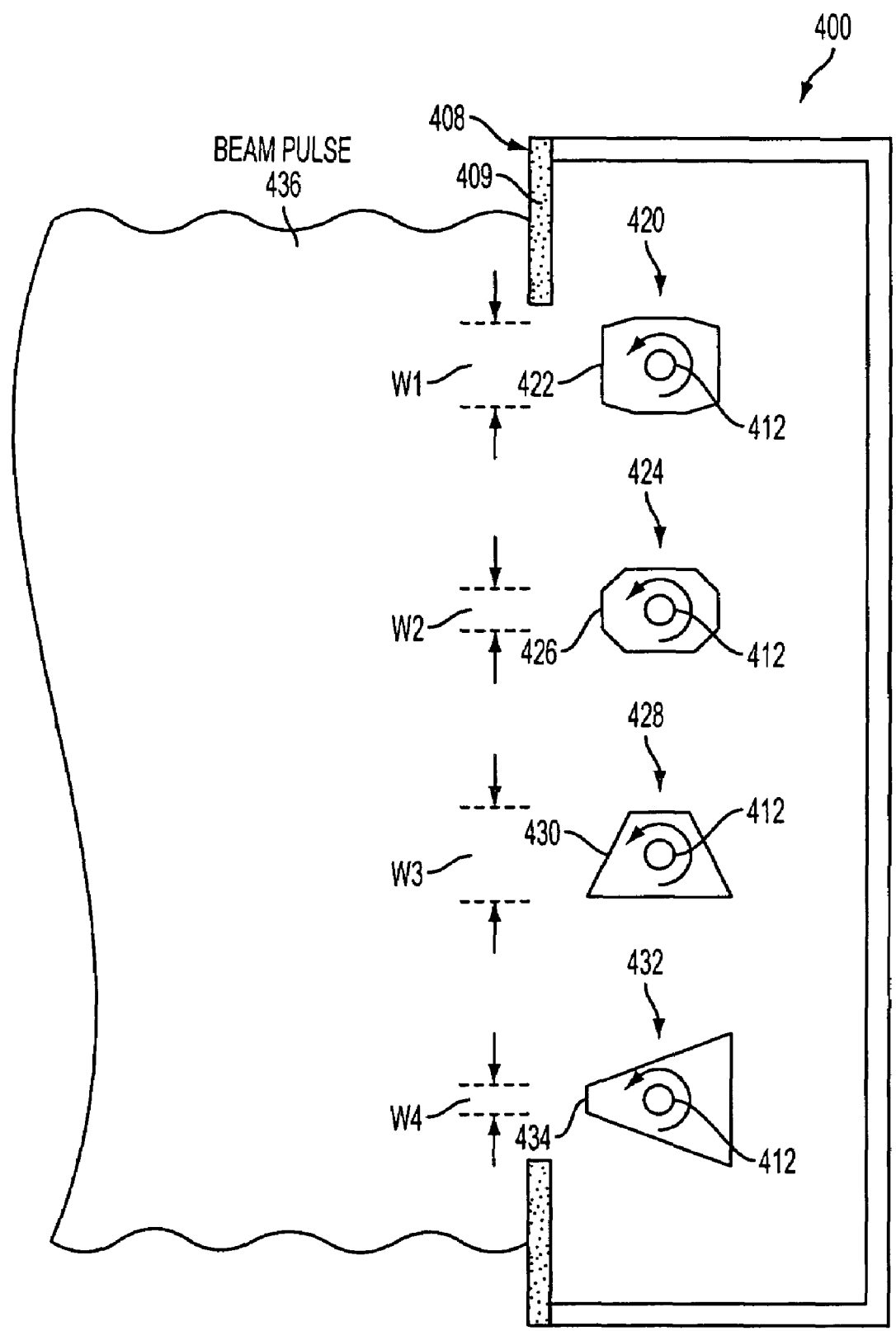
FIG. 22 is a side elevation view of the image control device of FIG. 21, illustrating the flow of a beam pulse toward the face of the image control device.

In another embodiment illustrated in FIGS. 20 through 23, the image former 401 includes the same components as the image former 201 except for the image control device 403. As best illustrated in FIG. 21, the image control device 400 includes: (a) a body or housing 402; (b) an array of reflector holders 406 connected to the housing 402 adjacent to the face 408; (c) an absorption plate or absorption surface 409 attached to or incorporated into the face 408; (d) an array of rotatable mirror segments, rotatable members or rotatable reflectors 403 rotatably supported by the reflector holders 406; and (e) an actuator assembly 407 operable to independently actuate and rotate the reflectors 403.

In one embodiment, the actuator assembly 407 includes: (a) a gear, drive shaft or transmission device 412 coupled to each one of the reflectors 403; (b) at least one drive assembly 414 operatively coupled to the transmission devices 412; and (c) a drive control unit 416 operatively coupled to the drive assembly 414. In one embodiment, the drive control unit 416 has a motor 418 which powers the drive assembly 414.

In one embodiment, each one of the reflectors 403 has a bar-shape and a plurality of substantially flat sides. At least one of the reflectors 403 has a geometry which is different than the geometry of at least one of the other reflectors 403. In the example illustrated in FIGS. 21 through 23: reflector 420 is oriented so that side 422 is adjacent to the face 408; reflector 424 is oriented so that side 426 is adjacent to the face 408; reflector 428 is oriented so that side 430 is adjacent to the face 408; and reflector 432 is oriented so that side 434 is adjacent to the face 408. The sides 422, 426, 430 and 434 are each different in length, width or shape. In the illustrated example, side 422 has width one (W1), side 426 has a different width two (W2), side 430 has yet a different width three (W3) and side 434 has yet a different width four (W4).

Figure 23:
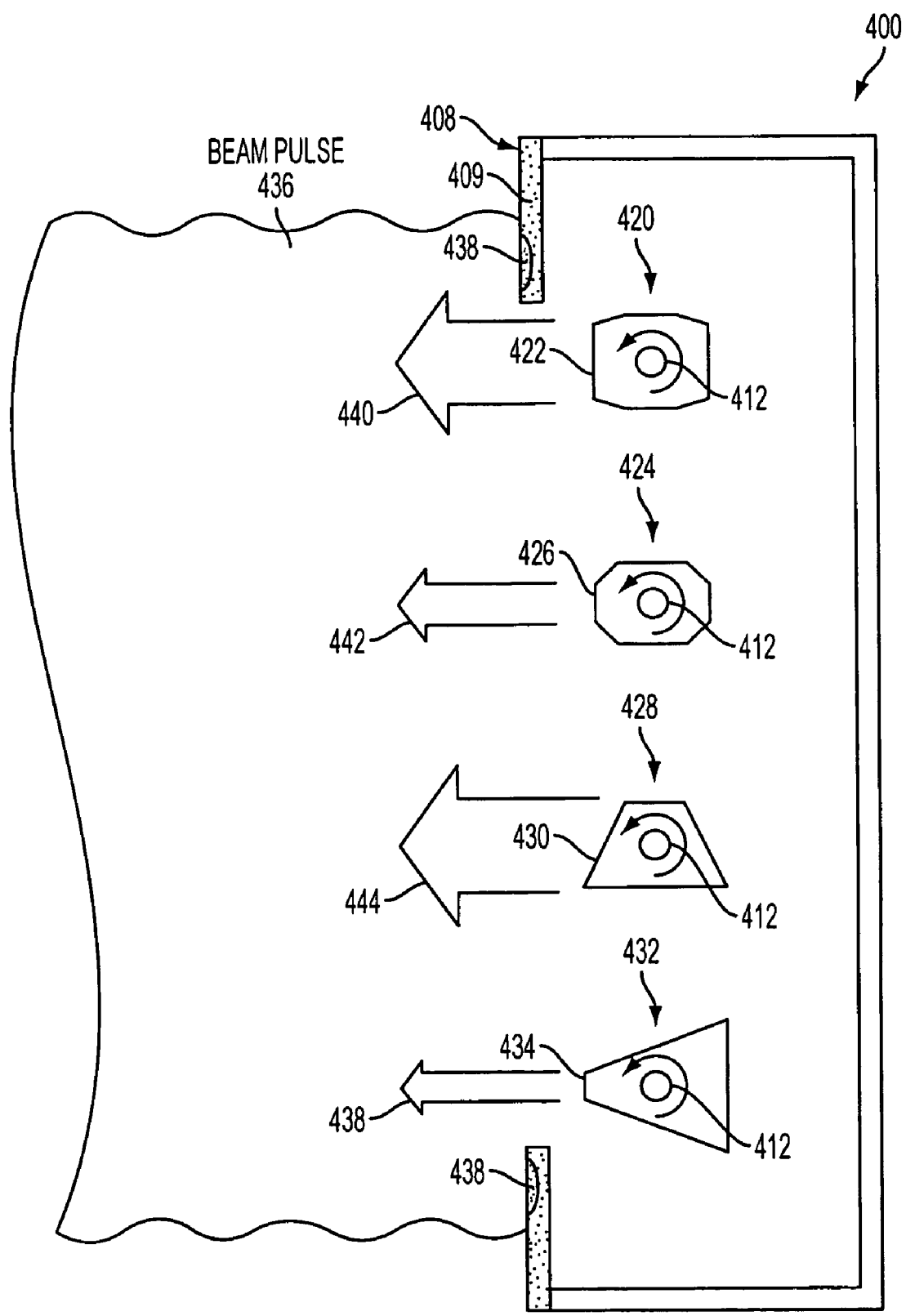
FIG. 23 is a side elevation view of the image control device of FIG. 21, illustrating the flow of sub-beams from the reflectors.

Referring to FIG. 23, when the beam pulse 436 strikes the absorption surface 409 of the face 408, the absorption surface 409 absorbs certain portions 438 of the beam pulse 436. At about the same time, the sides 422, 426, 430 and 434 reflect sub-beams 440, 442, 444 and 446, respectively, toward the object 16. Each of the sub-beams 440, 442, 444 and 446 has a different size or profile. Referring back to FIG. 21, these different beams 440, 442, 444 and 446 strike the object 16 and form bar shaped-images 448, 450, 452 and 454 of different widths in the object 16. The bar-shaped images 448, 450, 452 and 454 collectively form a bar code image 448.

In one embodiment not illustrated, the reflectors of the image control device 400 are identical in geometry and shape. However, the substantially bar-shaped sides of these reflectors have different percentages of reflective properties. For example, one side may have a relatively low reflective property and another side may have a relatively high reflective property. As the reflectors are independently rotated, the beam reflection varies to form variable images and codes in the objects 16.

In one embodiment, regardless of the position of the reflectors 403, the reflective template 455 constantly reflects a beam portion 457 of the beam pulse 436, and the beam portion 457 strikes the object 16. The shape of the reflective template 455 determines the shape of the beam portion 457 which, in turn, determines the shape of the image 459 formed on the object by the template 455. In one embodiment, the template 455 has a designated shape associated with an identifier or signature of the particular image forming device 401 being used. In one example not illustrated, the reflective template 455 is configured to form an additional row of reflective symbols. These symbols cause an alpha-numeric serial code to be formed in the object 16. This code corresponds to the serial code of the particular image forming device 401 being used.

In another embodiment, the template 455 has a designated degradation property associated with the reflectiveness of the template 455. For example, with each reflection event, the reflectiveness of the template 455 decreases. After a certain number of reflection events, the template 455 will absorb all or substantially all of the laser beam received. As a result, the authenticity identifier or signature of the image forming device 401 will be excluded from the objects 16. This can indicate a need to replace the image control device 400 of the image forming device 401.

2.1.3 Electronic Configuration

Figure 24:
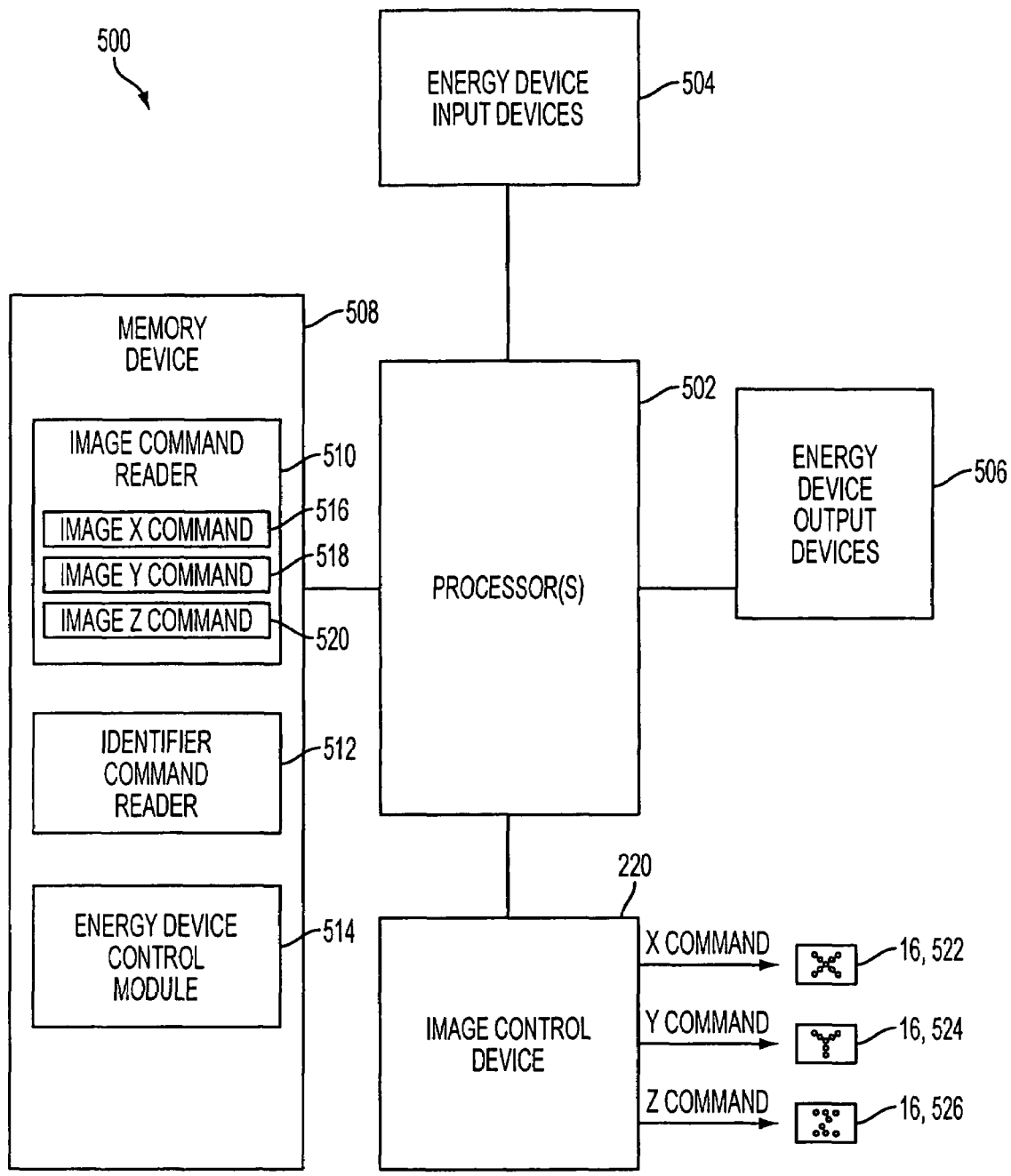
FIG. 24 is a schematic, diagrammatic view of one embodiment of the electronic configuration of one embodiment of the image former.

In one embodiment, the image former 200 has an electronic configuration 500, as illustrated in FIG. 24. In this embodiment, the image former 200 includes: (a) one or more processors 502; (b) one or more energy device input apparatuses 504 which are electronically connected to the processors 502; (c) one or more energy device output apparatuses 506 which are electronically connected to the processors 502; (d) the image control device 220 electronically connected to the processors 502; and (e) a memory device 508 which is coupled, directly or over a data network, to the processors 502.

In one embodiment, the memory device 508 includes an image command reader 510, an identifier command reader 512 and an energy device control module 514. The image command reader 510 includes a plurality of computer-readable instructions which enable the processors 502 to read image commands. The image commands specify which type of images are to be formed on each of the objects 16. For example, the image command reader 510 may include: an image X command 516 associated with an X-shape image; an image Y command 518 associated with a Y-shaped image; and an image Z command 520 associated with a Z-shaped image. In operation, one of the processors 502 uses these commands to control the different images produced by the image control device 220 on the different objects 522, 524 and 526.

The identifier command reader 512 includes a plurality of computer readable instructions which one of the processors 502 uses to read the identifier commands. The identifier commands specify which type of identifier image is to be formed on the object 16. In one embodiment, the identifier image includes a designated image associated with the authenticity of the imagery on the objects 16. For example, the identifier image can include a trade name associated with a particular processing facility 14 or a serial number associated with a particular image forming device 200.

The energy device control module 514 includes a plurality of computer readable instructions associated with the general control and functionality of the energy device 202. The control module 514 direct one of the processors 502 to control the energy level, pulsation and other operational settings of the energy device 202.

2.1.4 Image Forming Device with Multiple Energy Generators

Referring back to FIG. 3, in one embodiment, the image forming device 200 includes a plurality of laser generators or lasers 208. Each laser 208 generates a laser beam resulting in a stream of beam pulses. The multiple streams of beam pulses are directed so as to form images in one or more objects 16.

Figure 25:
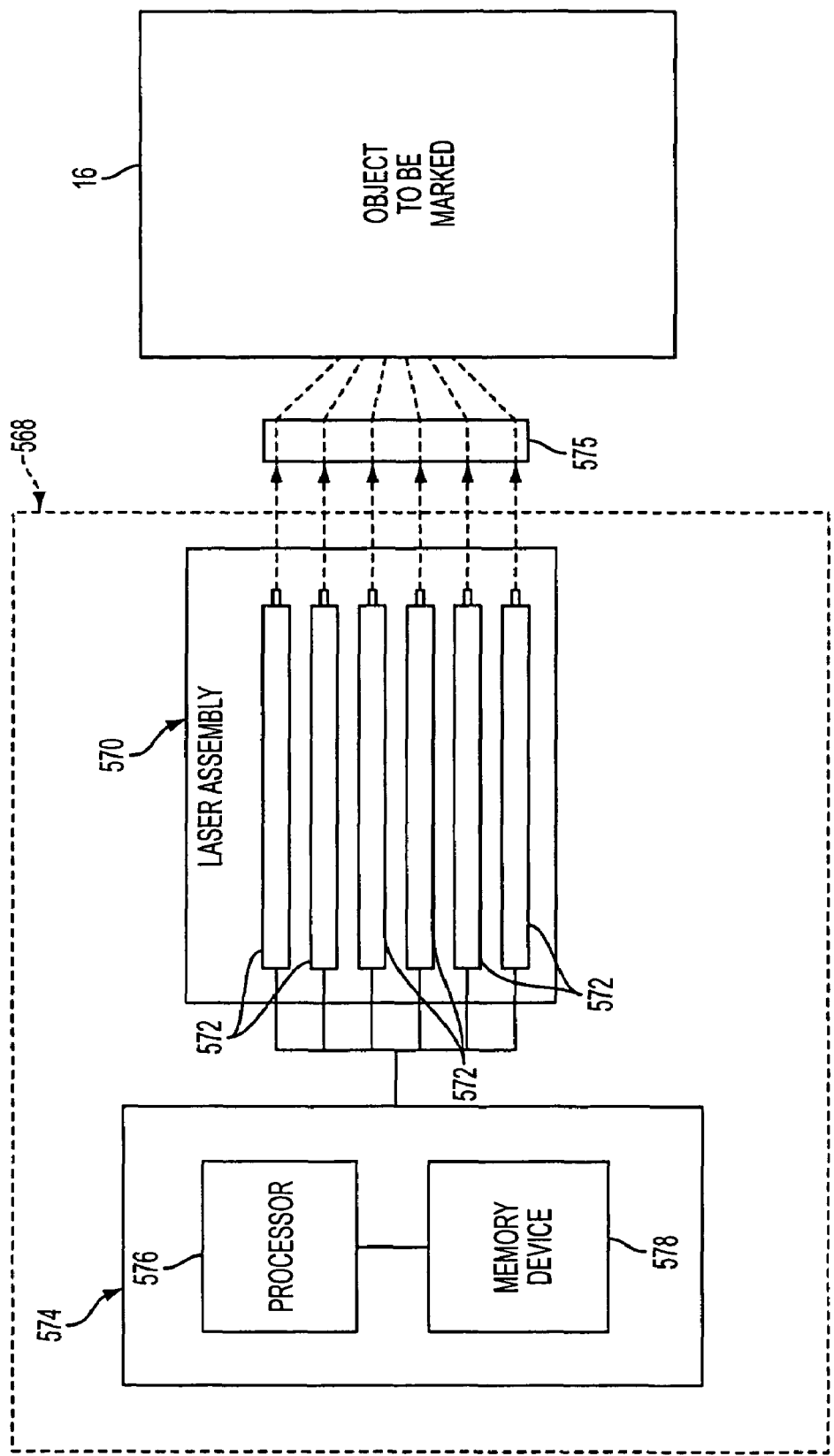
FIG. 25 is a schematic, diagrammatic view of another embodiment of the image former, illustrating an example of the output of multiple laser beams toward an object to be marked.

In another embodiment illustrated in FIG. 25, the image forming device 568 includes: (a) a laser generator assembly 570 which houses or holds a plurality of relatively small laser generators or lasers 572; (b) a control unit 574 which controls the operation of the lasers 572; and (c) a focus lens or focuser 575. The control unit 574 includes a processor 576 and a memory device 578 which stores a plurality of computer-readable instructions. The processor 576, as directed by the memory device 578, controls the operation of the lasers 572. The control unit 574 causes the lasers 572 to independently output laser beams in continuous or pulse form, and the focuser 575 redirects the beams, bringing them in closer proximity to one another By independently controlling which ones of the lasers 572 will output a beam, the control unit 574 determines the image that is formed on the object 16. For example, the assembly 570 may be configured to hold one hundred lasers 572 in a grid or matrix-shaped array. By selectively turning certain lasers 572 on and off, the control unit 574 can form designated images (and associated codes) in the objects 16.

In one embodiment, the lasers 572 include suitable electronic lasers such as semiconductor lasers or diode lasers. In one embodiment, each of the lasers 572 includes a fiber optic cable or device which outputs a laser beam. It should be appreciated that the lasers 572 can include any suitably sized computer-controlled energy generators.

2.1.5 Marked Objects

The image forming device 200 produces a mark, code or image through the application of one or more energy streams or laser beams to an object 16. The process of applying such an energy stream or laser beam to the object 16 can include a plurality of different physical effects, including, without limitation, a burn in the object 16, a melting of a spot on the object 16, a vaporization of a spot on the object 16, a cut in the object 16, an etch in the object 16, an engraved effect in the object 16, an inscription in the object 16, an abatement of a portion of the object 16, a modification of or change in the physical or molecular structure of a portion of the object 16 or a change in the reflective or refractive properties of a portion of the object 16.

In one embodiment, each laser beam forms a dot in the object 16. Each dot can have a square shape as illustrated in FIGS. 26-29, 32 and 33. It should be appreciated, however, that in other embodiments each dot can have a circular shape or any other suitable shape.

Figure 26:
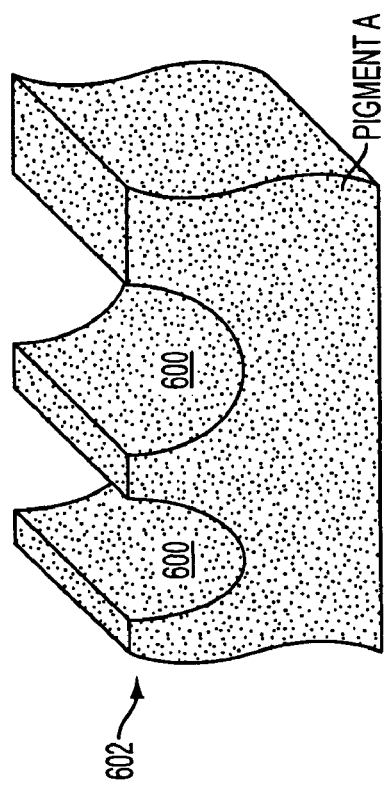
FIG. 26 is a perspective fragmentary view of one example of an object of a single pigmentation which has been modified by one embodiment of the image system.

In one example illustrated in FIG. 26, each laser beam output by the image former 200 cuts, burns or otherwise forms a cavity 600 in an object 602. The object 602 has a relatively consistent pigmentation, exemplified as pigment A. The cavity or hole pattern in the object 602 provides the object 602 with an reflective or refractive characteristic or property associated with a designated code or image, such as image 616 or 618 of FIGS. 28 and 29. In one example, a human eye or an optical reader can detect an image or code in the object 602 defined by an array of cavities 600. Here, each cavity 600 is visually distinct from the body of the object 602 due to the depth of the cavity 600.

Figure 27:
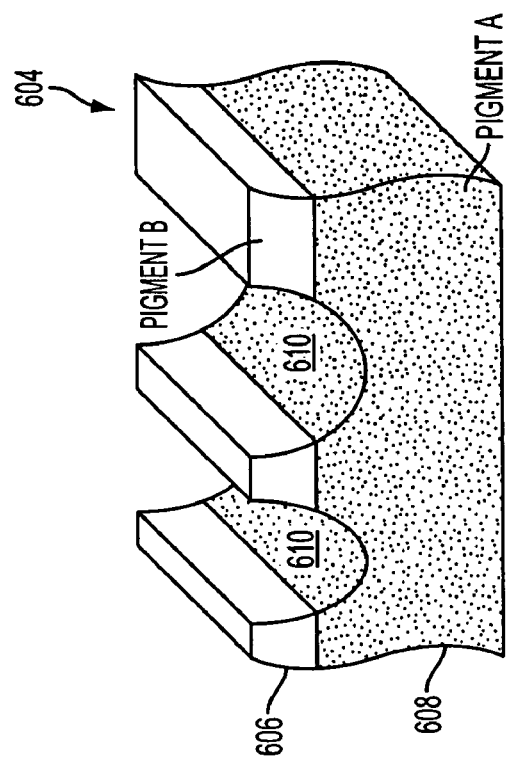
FIG. 27 is a perspective fragmentary view of one example of an object of different pigmentations which has been modified by one embodiment of the image system.

In another example illustrated in FIG. 27, an object 604 includes a lower layer 608 having pigment A and an upper layer 606 have pigment B. Each of the laser beams output by the image former 200 forms an opening or cavity 610 in the object 604. These cavities 610 define an image or code, such as image 616 or 618 of FIGS. 28 and 29, and the image can be readable by human eye or an optical reader. The image is enhanced by the contrast between the color of pigment A and pigment B. Put another way, each of the laser beams removes the top layer 606, exposing a different colored layer 608. If pigment A were blue and pigment B were yellow, the laser beams would remove spots of the yellow layer 606, exposing spots of the blue layer 608 below. The result would be an image defined by a plurality or array of blue dots.

In one embodiment, the laser beams either do not form cavities in the object 16, or the cavities formed are small enough so that the cavities are undetectable by human vision or an image reader. Here, each laser beam applies a level of heat to the object 16 and, as a result, the reflective or refractive properties of the object 16 are changed at certain spots. Depending upon the embodiment, the visual effect of these properties can be detectable by the human eye, an optical reader or any suitable electromechanical device. Accordingly, in one embodiment, the image former 200 can form images and codes on objects without cutting or otherwise forming cavities in the surface or body of the object.

In another embodiment, the energy generator of the image forming device produces laser beams which pass through the surface of the object and form dots or marks below the surface of the object. In one example, the image forming device includes a YAG laser, and the objects to be marked are constructed of a glass or clear plastic material. When marking one of these objects, the laser beams of the YAG laser pass through the object's exterior surface. Each laser beam strikes an inner portion of the object. At this point, the laser beam produces a dot, mark or structural or chemical change to that inner portion of the object. Accordingly, the laser beams collectively form a machine-readable or human-readable mark or code embedded within the body of the object. This embodiment provides additional protection against the attempts of counterfeiters to modify or reproduce the codes in the objects. Also, this embodiment provides a safeguard against the damage of the codes caused by abrasion or chemicals.

2.1.5.1 Example of Coding Pharmaceutical Products

Figure 28:
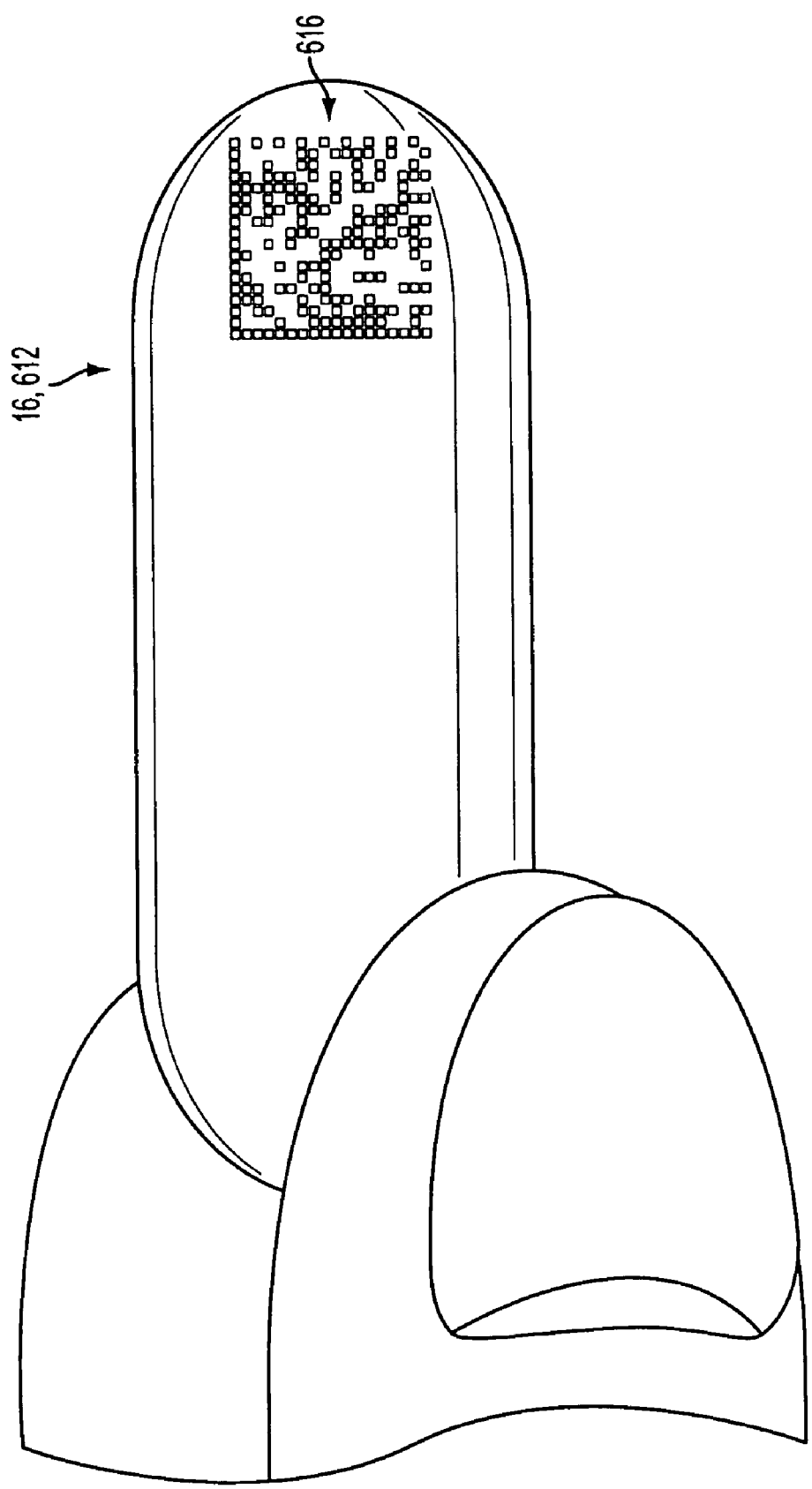
FIG. 28 is a perspective view of an example of a pharmaceutical capsule which has been laser-marked with a matrix code through use of one embodiment of the image system.

In one example, the object 16 that is marked by the image former 200 includes a pharmaceutical capsule 612 as illustrated in FIG. 28. Here, each laser beam forms a cavity or hole in the outer gelatin layer or covering of the capsule 612. These cavities expose a different colored layer, forming an image of a matrix code 616 which is readable by an optical reader or scanner.

Figure 29:
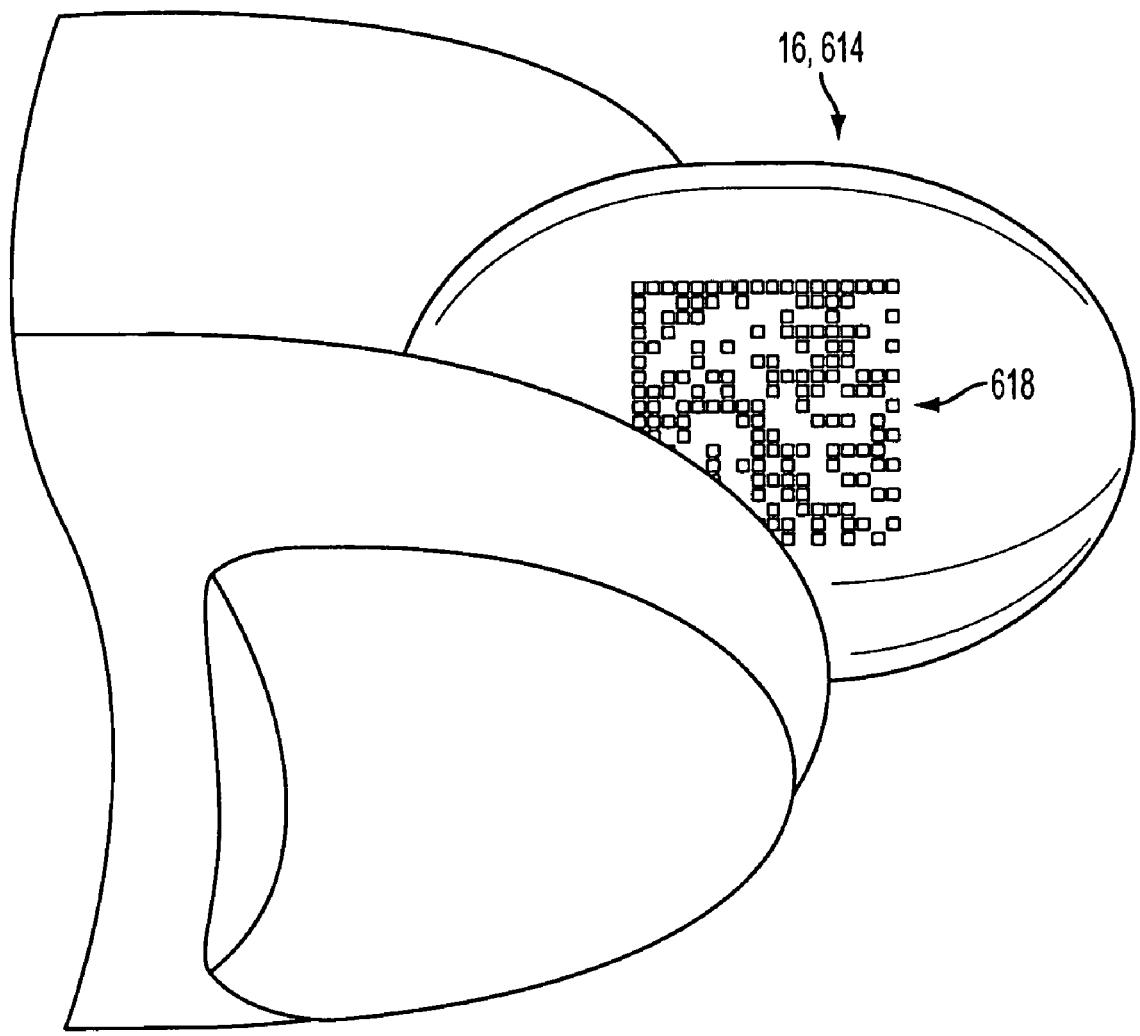
FIG. 29 is a perspective view of an example of a pharmaceutical tablet which has been laser-marked with a matrix code through use of one embodiment of the image system.

In another example, the object 16 includes a pharmaceutical tablet 614, as illustrated in FIG. 29. Here, each laser beam forms a cavity or hole in the body of the tablet 614. These cavities expose a different colored layer, forming an image of a matrix code 618 which is readable by an optical reader or scanner.

2.1.5.2 Example of Coding Mission Critical Products

Figure 30:
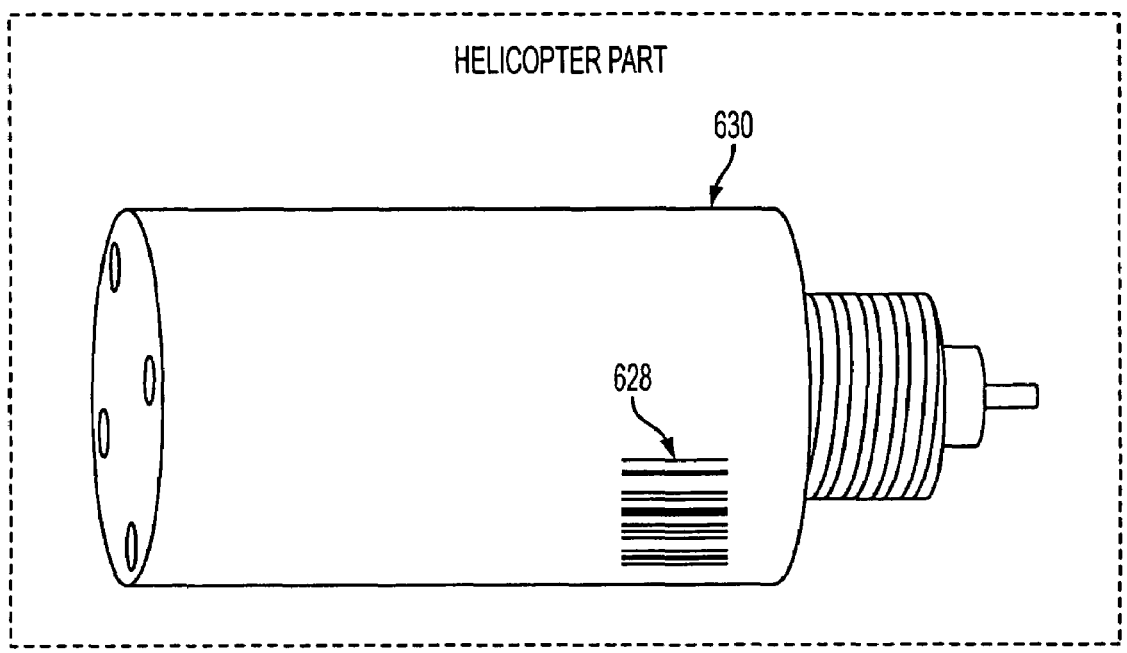
FIG. 30 is a perspective view of an example of a mission critical helicopter part which has been laser-marked with a bar code through use of one embodiment of the image system.
Figure 31:
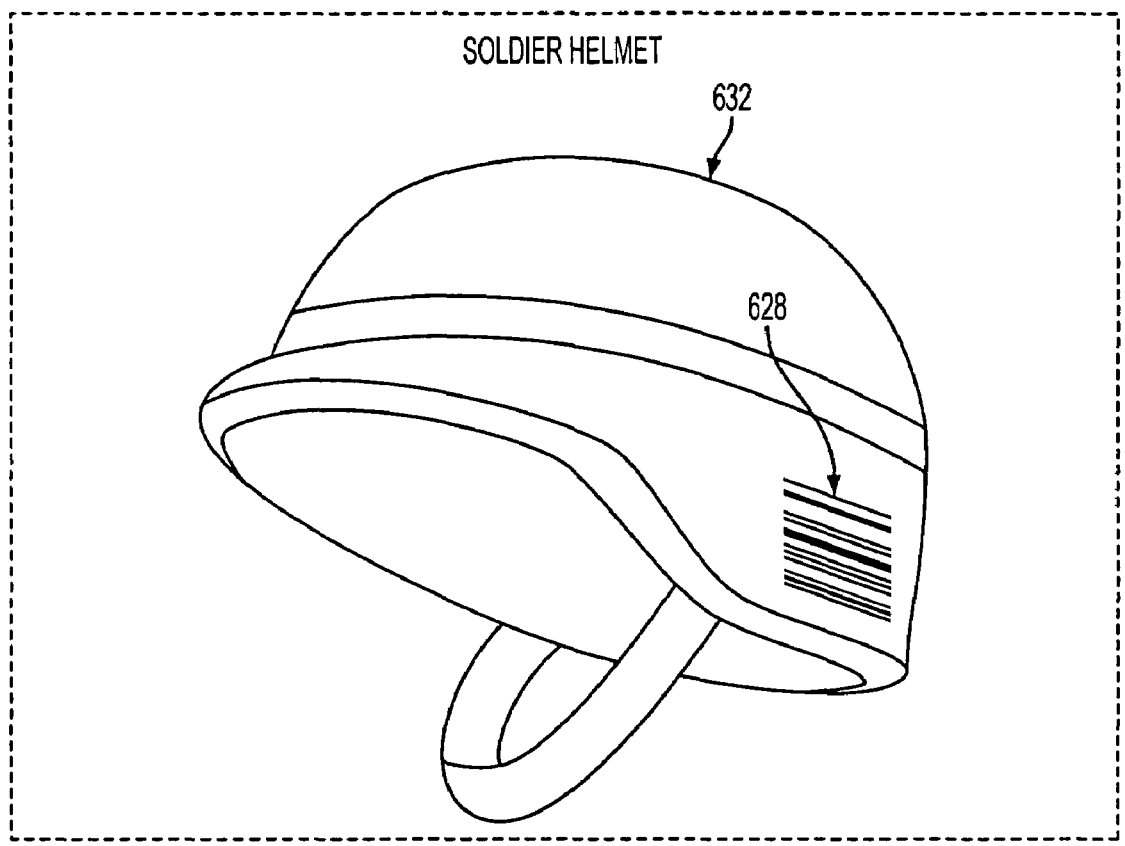
FIG. 31 is a perspective view of an example of a mission critical military or soldier helmet which has been laser-marked with a bar code through use of one embodiment of the image system.

In one example illustrated in FIGS. 30 and 31, the image former 200 forms bar codes 628 in mission critical products, such as a military helicopter part 630 and a soldier's helmet 632. Here, the laser beams output by the image former 200 form bar-shaped cavities in the outer surfaces of parts 630 and 632. The depth of the cavities forms an optical contrast associated with a bar code that is readable by a scanner.

2.1.5.3 Example of Forming Graphics on Consumer Products

Figure 32:
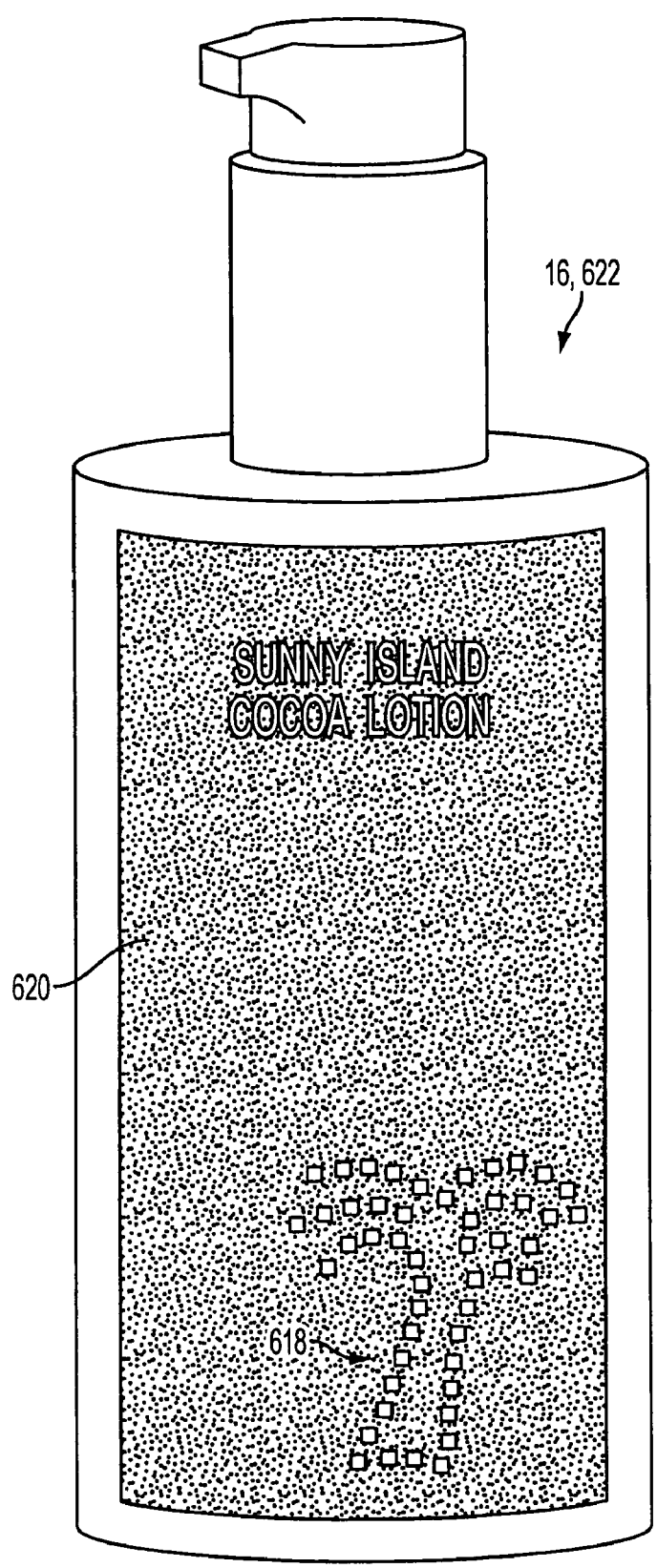
FIG. 32 is a perspective view of an example of a consumer lotion product bottle which has been laser-marked with a graphical image of a coconut tree through use of one embodiment of the image system.
Figure 33:
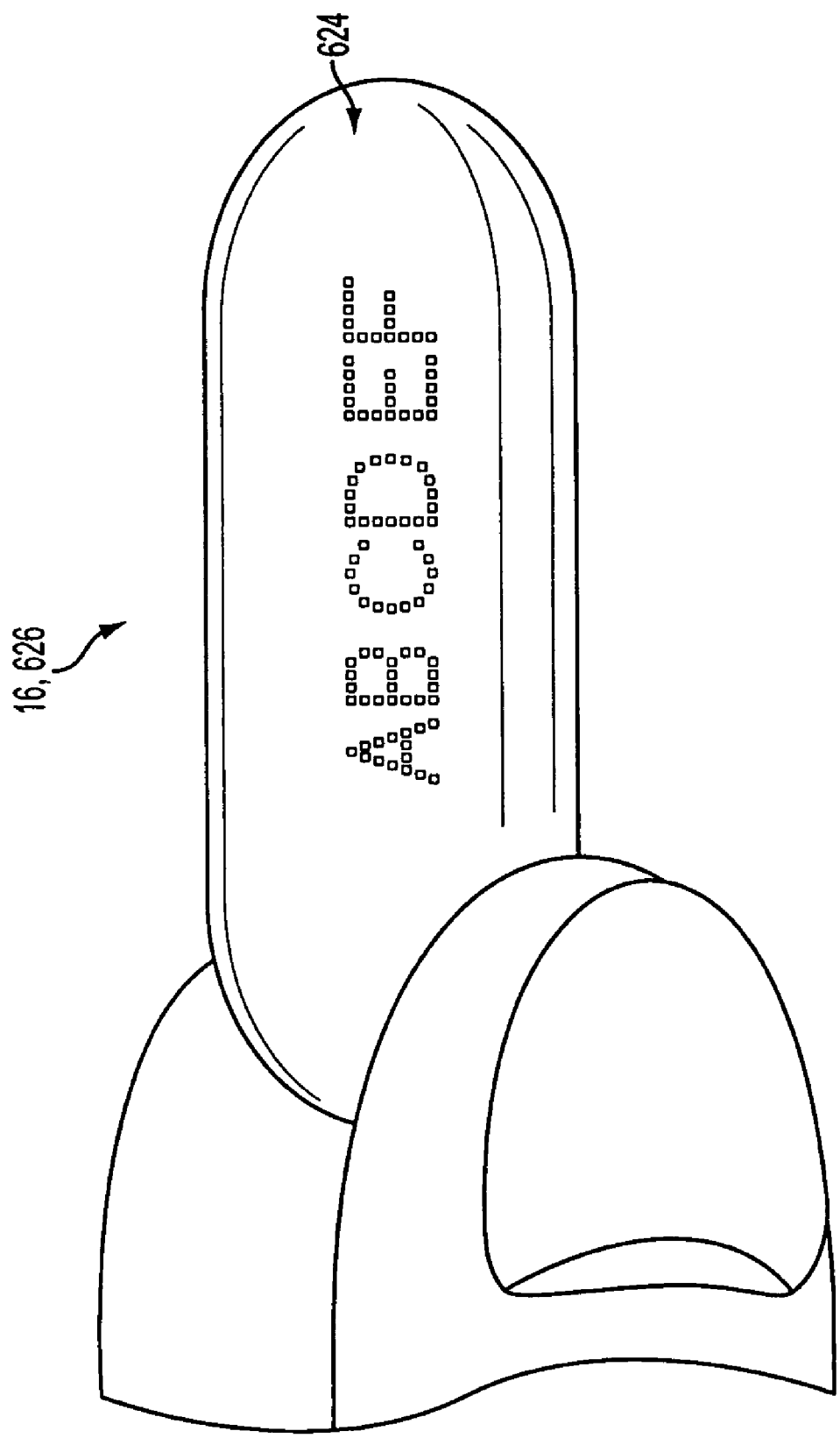
FIG. 33 is a perspective view of an example of a pharmaceutical capsule which has been laser-marked with human-readable text through use of one embodiment of the image system.

In another example illustrated in FIG. 32, the image former 200 forms a graphic or graphical representation 618 in the label 620 of a product 622. In the illustrated example, the image former 200 forms an image or graphic 618 of a coconut tree on the bottle of a Sunny Island Cocoa Lotion™ consumer product. In another example illustrated in FIG. 33, human-readable text 624 can be formed in the surface of an object 16 such as a pharmaceutical capsule 626. Through these examples, it should be understood that human-readable and comprehendible images of various types can be formed by the image forming device 200. These images can include, without limitation, text, numbers, symbols, drawings, artistic works and graphics which convey messages, information, product information, manufacturers' identifies and other information to consumers and end users.

3. Image Management System

Figure 34:
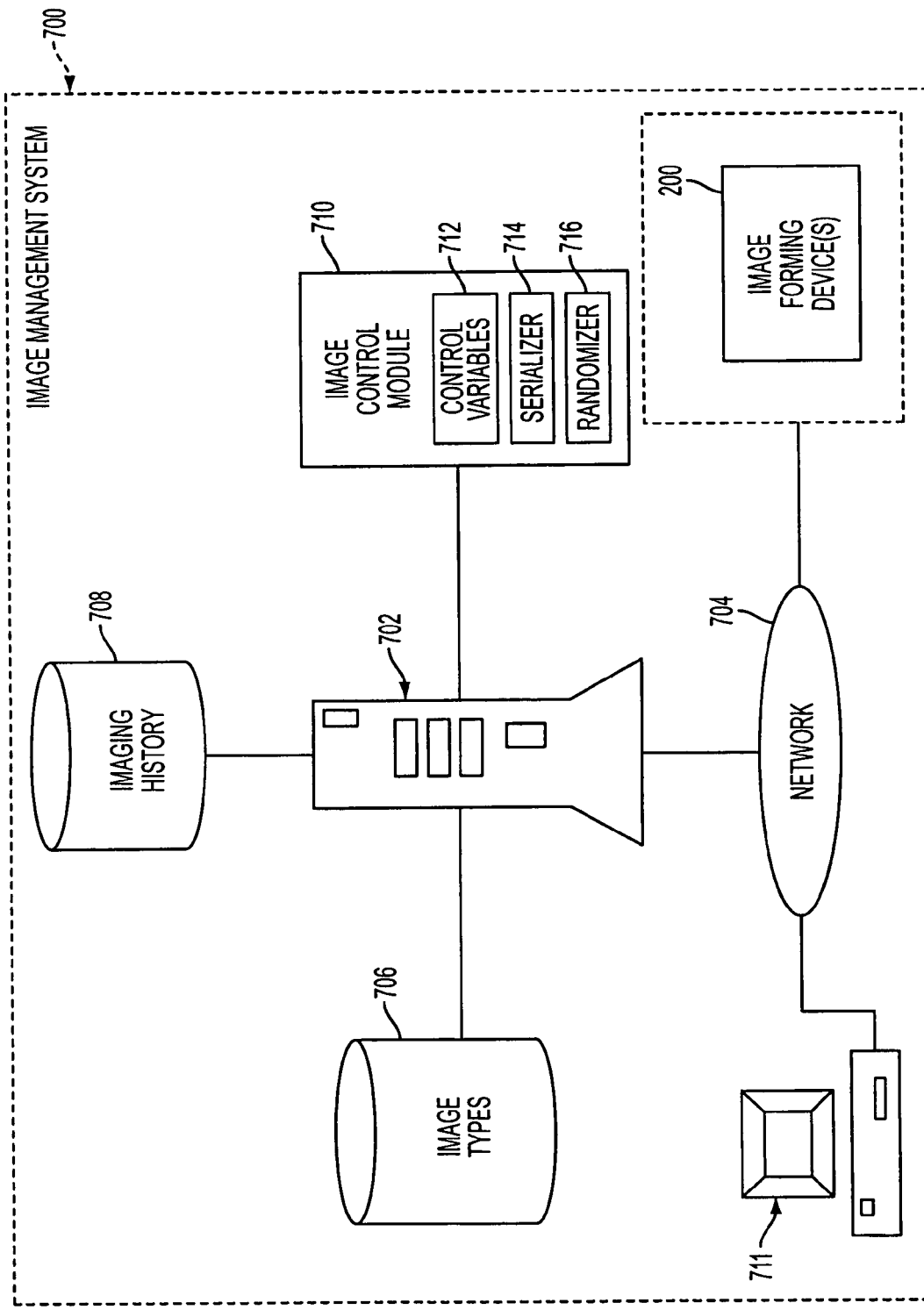
FIG. 34 is a schematic, diagrammatic view of one embodiment of the image management system.

The image system 12 includes an image management system 700 as illustrated in FIG. 34. In one embodiment, the image management system 700 includes: (a) one or more servers or processors, such as management server 702 connected to one or more image forming devices 200 over a data network 704; (b) an image-type database 706 coupled to the server 702; (c) an imaging database 708 coupled to the management server 702; (d) an image control module 710 coupled to the management server 702; and (e) a network access device, such as a computer 711, which enables a manager to send commands to the management server 702 and provide inputs which are readable by the management server 702. The data network 704 can include a local area network in the object processing facility 14, a private wide area network or a public wide area network, such as the Internet. The image-type database 706 stores data associated with a plurality of different types of images which can be formed on the objects 16.

The imaging history database 708 stores data associated with the images that have already been formed on objects 16 in the supply chain. For example, if a processing facility marks ten thousand products with an image corresponding to code 10011011, the database 708 would store the data which relates such products to such code.

The image control module 710 includes a plurality of computer-readable instructions which direct the management server 702 to change the images formed on the objects 16 in accordance with a designated parameter or condition. In one embodiment, the control module 710 includes a plurality of control variables 712. In one example illustrated in FIG. 35, the control variables 712 include a facility variable 716, an image forming device variable 718, a product variable 720, a volume variable 722, an image or code variable 724, a date variable 726 and a time variable 728. In the example illustrated in the first row of FIG. 35, the manager enters his/her user name and password at the computer 711, and then the manager uses the computer 711 to set: (a) the facility variable 716 to facility number 22; (b) the image forming device variable 718 to image forming device number 03; (c) the product variable 720 to product number 4331; (d) the volume variable 722 to one thousand; (e) the image variable 724 to image number fifty-two which corresponds to code 10101111; (f) the date variable 726 to Mar. 2, 2008; and (g) the time variable 728 to thirteen hundred hours. In this example, the management server 702 uses the image control module 710 to cause image forming device number 03 of facility number 22 to form image Y in one thousand of the product units beginning at thirteen hundred hours on Mar. 2, 2008.

In another embodiment, the image control module 710 includes a serializer module 714. The serializer module 714 includes a plurality of instructions associated with generating a series of unique or serial codes and associated images to be formed in a series of objects 16. In one embodiment, the image control module 710 includes a pseudo randomizer 716 which, when activated by the manager, randomly selects different images (and associated codes) that are formed on the objects in a designated batch.

4. Image Reader

Figure 36:
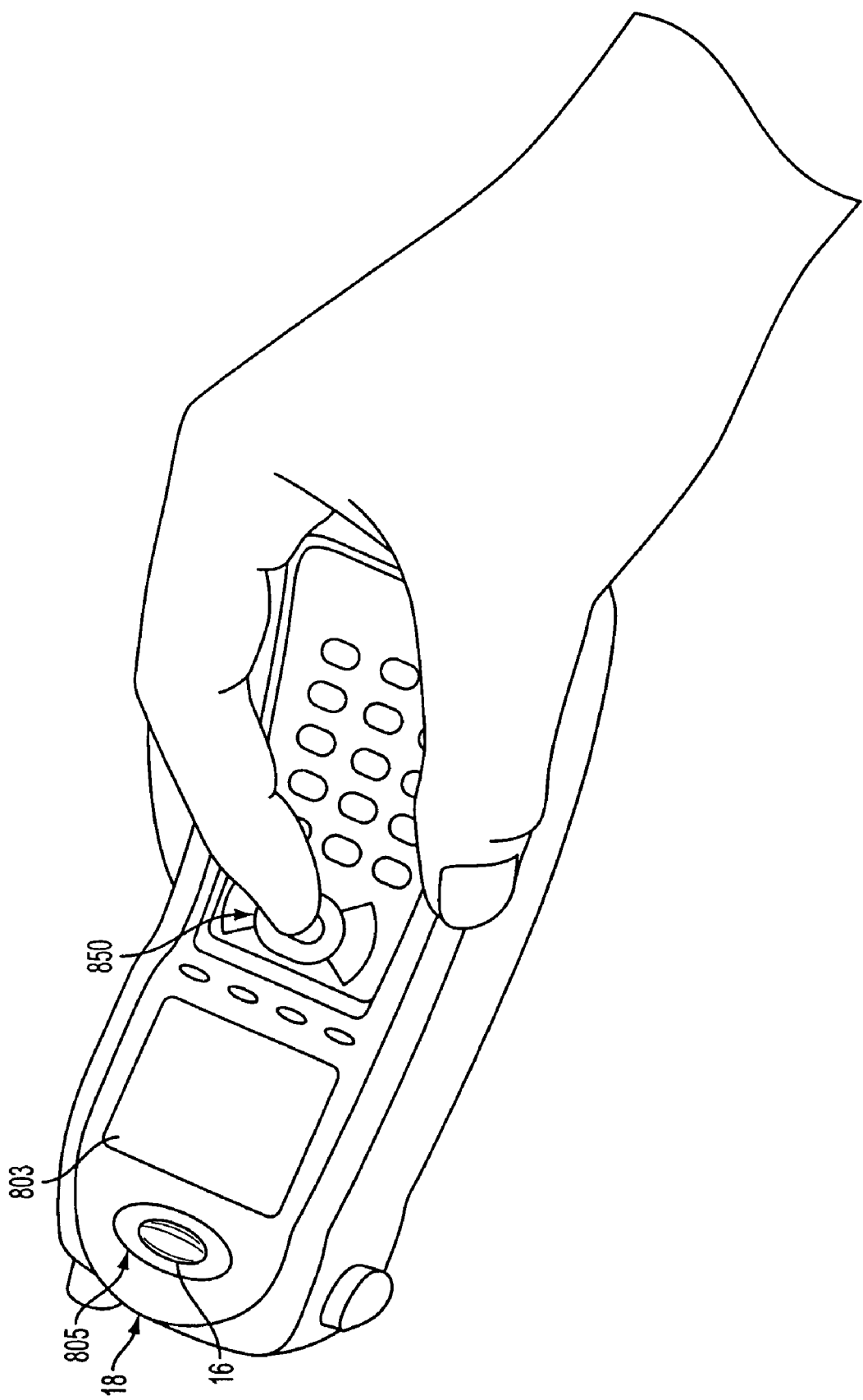
FIG. 36 is a top perspective view of one embodiment of the hand-held scanner or reader, illustrating the reading of a matrix code.

Referring to FIG. 36, in one embodiment, the reader or hand-held scanner 18 includes a plurality of input devices 850, a display device 803, a laser (not shown), a light source (not shown), an optical sensor or eye (not shown) and an object holder 805. In the illustrated example, the reader 18 is scanning and reading a matrix code (not shown) of an object 16. The object holder 805 removably holds the object 16 so that the matrix code on the object 16 is oriented toward the eye housed within the scanner 18.

Figure 37:
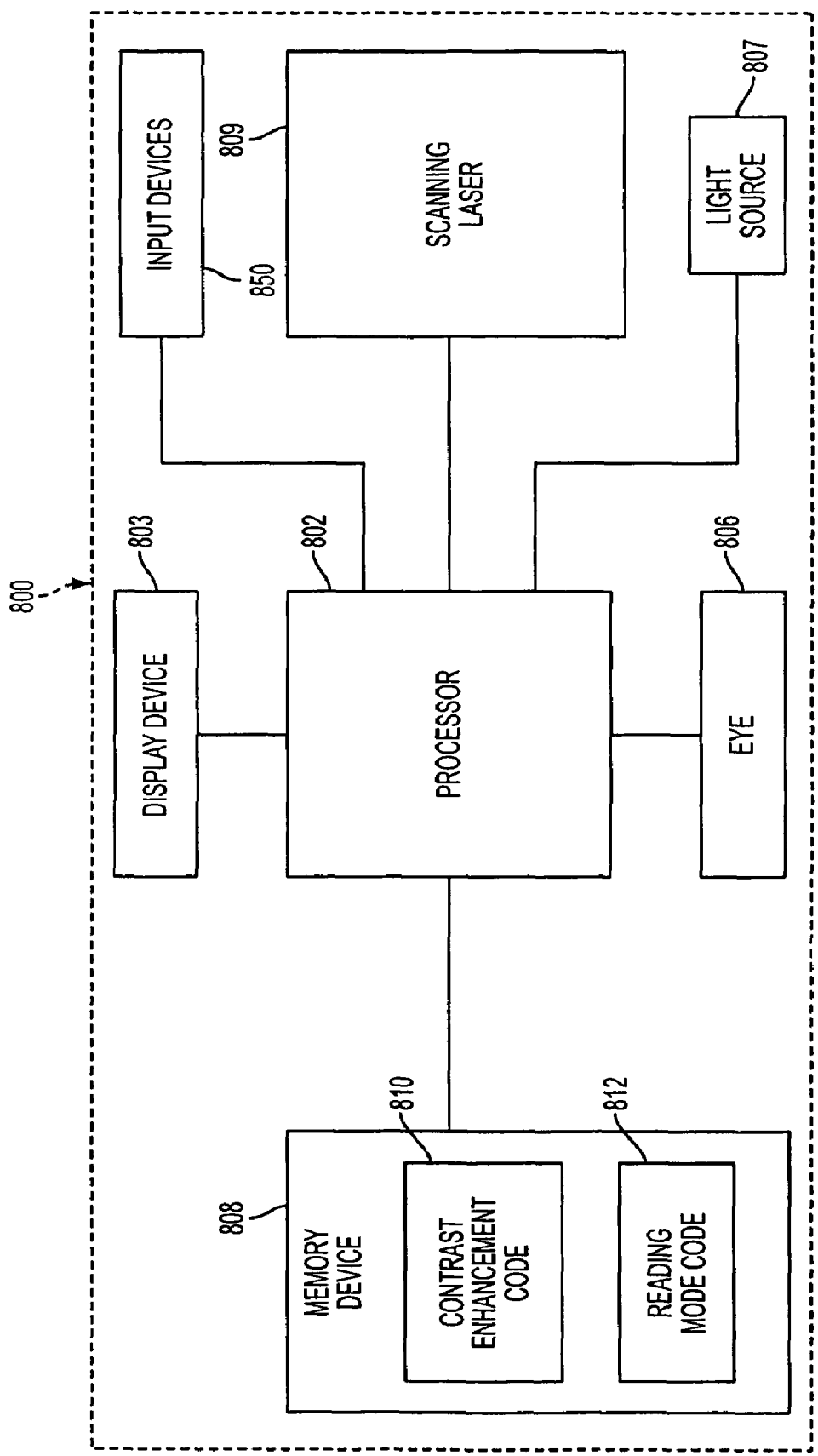
FIG. 37 is a schematic, diagrammatic view of one embodiment of the electronic configuration of one embodiment of the image reader.
Figure 38:
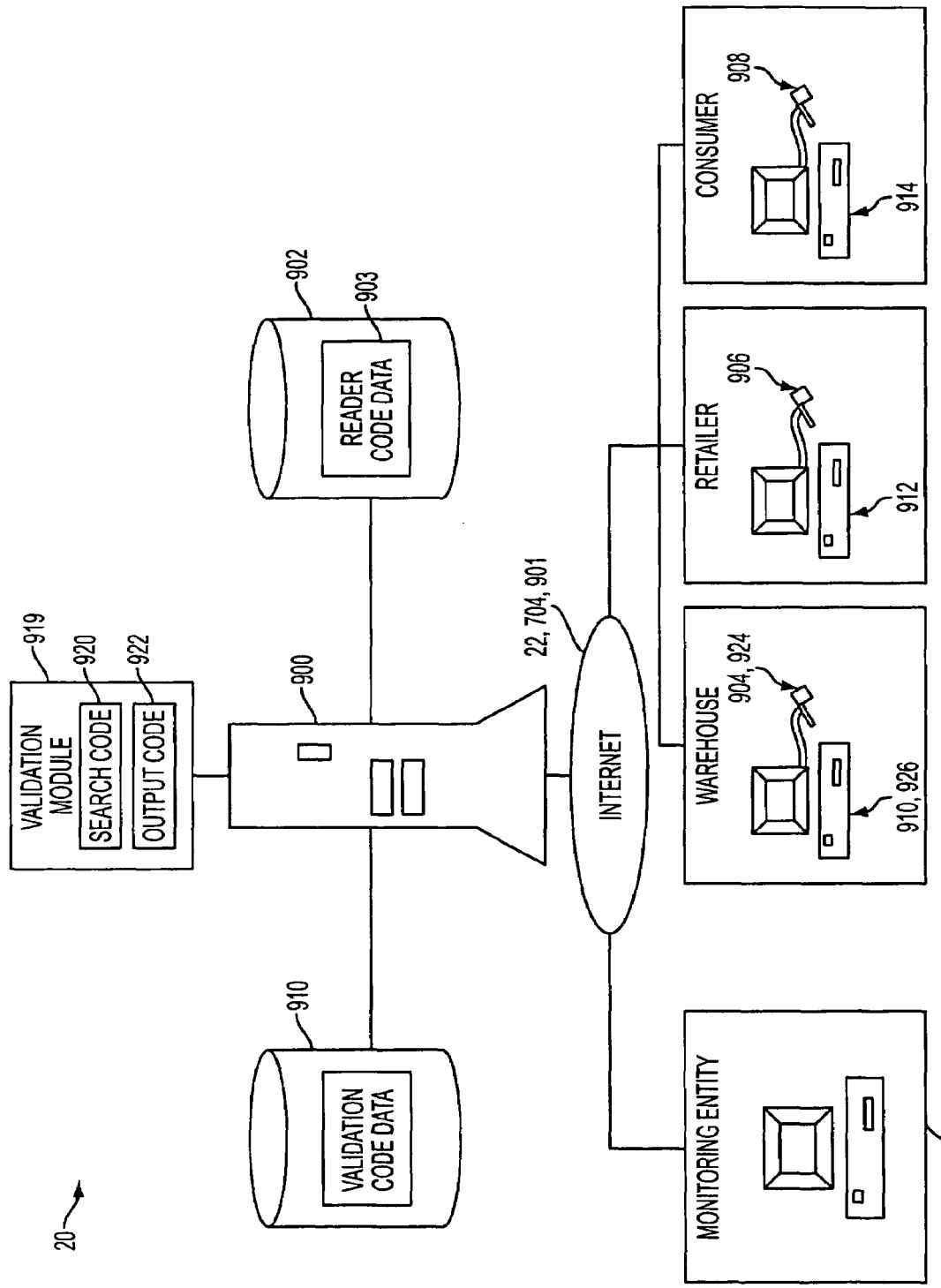
FIG. 38 is a schematic, diagrammatic view of one embodiment of the object tracking system.

In one embodiment illustrated in FIG. 37, the optical reader or image reader 18 has an electronic configuration 800. Here, the image reader 18 includes at least one central processing unit or processor 802. The processor 802 is electronically connected to a display device 803, a plurality of input devices 850, a scanning laser 809, a light source 807, a photo eye 806 and a memory device 808. The light source 807 enhances the readability of the code on the object. Depending upon the embodiment and the type of code being read, the light source 807 can include a polarized light source, an ultraviolet light source or any other suitable light source operable to illuminate or distinguish the code on the object.

The memory device 808 includes contrast enhancement code 810 and reading mode code 812. The contrast enhancement code 810 include a plurality of computer-readable instructions associated with enhancing the readability or detectability of codes (such as dot matrix code and bar code) and images formed in the objects 16 by the image former 200. The reading mode code 812 includes a plurality of instructions associated with different types of reading modes. For example, one reading mode enables the processor 802 to read matrix code, and another reading mode enables the processor 802 to read bar code. Users can use the image reader 18 in conjunction with the object tracking system 20 as described below.

5. Object Tracking System

In one embodiment illustrated in FIG. 37, the object tracking system 20 includes: (a) one or more processes or servers, such as tracking server 900 operating on a data network 901, such as the Internet; (b) a reader database 902 connected to the tracking server 900 which stores the reader code data 903 received from the image readers 904, 906 and 908 coupled to the distribution point computers 910, 912 and 914, respectively; (c) a validation database 910 connected to the tracking server 900; (d) a server, processor or computer system 918 of a monitoring entity connected to the tracking server 900 over the network 901; and (e) a validation module 919 operatively coupled to and accessible by the tracking server 900.

The validation database 910 includes validation code data 920 associated with the objects or products that have been coded and sent into the supply chain. In one embodiment, the image management system 700 (illustrated in FIG. 34) is coupled to the tracking server 900 over network 901. Accordingly, the image management system 700 automatically transfers the validation code data 920 to the validation database 910 as objects 16 are coded and sent into the supply chain.

The validation module 919 stores: (a) a plurality of computer-readable instructions or search commands 920 associated with the searching of the validation database 910 for a match with a code stored in the reader database 902; and (b) output instructions or commands 922 associated with producing an output, such as a graphical flag or audio alert, if there is an unsuccessful validation or trouble event.

In one example, the tracking server 900 conducts the following steps under the direction of the validation module 919:

(a) detects a new code received from one of the readers or scanners 924 coupled to distribution point computer 926;

(b) searches the validation database 910 for a code that matches the newly received code;

(c) sends a signal or data to the monitoring entity computer 918, causing the monitoring entity computer 918 to produce an audio or visual output or alarm if there is an unsuccessful validation; and (d) sends a signal or data to the distribution point computer 926 and (if network enabled) the scanner 924 itself, causing the distribution point computer 926 and network enabled scanner 924 to produce:

(i) an audio or visual output or alarm indicating a successful validation if the tracking server 900 located a matching code in the validation database 910; and (ii) an audio or visual output or alarm indicating an unsuccessful validation if the tracking server 900 did not locate a matching code in the validation database 910 after a designated period of time elapses.

In operation of one example, the Pharma Zone company manufactures a batch of ten thousand drug capsules on a Monday, using an image forming device to form: (a) an image of the text "Pharma Zone 2000" in each of the capsules; and (b) an image of a designated machine-readable matrix code in each of the capsules. On Tuesday, Pharma Zone ships the batch of capsules to a drug store. On that same Tuesday, a counterfeiting supplier ships one thousand drug capsules to the same drug store under an invoice which appears to be an authentic invoice of Pharma Zone. The one thousand drug capsules also bear the text "Pharma Zone 2000." The pharmacist's assistant uses a scanner to scan the drug capsules received that day. When the assistant scans one of the counterfeit drug capsules, the drug store's computer indicates "WARNING: COUNTERFEIT DETECTED!" The drug store then removes all detected counterfeits from the capsule supply and contacts the appropriate authorities.

In review, the supply chain monitoring system, in one embodiment, includes an image system located in a manufacturing facility, and the imaging system is coupled to a plurality of scanners and an object tracking system over a wide area network, such as the Internet. The image system includes one or more image forming devices which are operable to form images and codes in objects while the objects are in motion on a conveyor. In one embodiment, each image forming device includes a pulsed laser and an image controller which receives the laser pulses in increments. The image controller receives each laser pulse and generates a laser output which includes: (a) a different laser pulse associated with a designated image or code; or (b) a plurality of simultaneously traveling laser beams which are collectively associated with a designated image or code. Each of the laser outputs is directed toward an object on the conveyor, and the laser output forms an image or code in the object in a single shot. The image or code can be machine readable, human readable or a combination thereof. When the marked objects are shipped to a distribution point, inspectors or quality control personnel can scan the objects to verify their authenticity. The system checks the scanned images against a validation database, and the system notifies the scanning personnel and monitoring entities of any detected counterfeits. This type of system increases the security of supply chains and distribution channels to enhance safety and help protect businesses against counterfeit practices.

It should be appreciated that any and all of the various components of the image forming devices described herein, including, without limitation, the image forming devices 200, 201 and 401, can be combined or interchanged, thereby constituting additional embodiments of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An image management system comprising;
  a memory device accessible by at least one processor, the memory device configured to be operatively coupled to an input device, the input device being operable to produce a plurality of input signals associated with a plurality of different images, the memory device storing a plurality of instructions, the instructions directing the processor to:
  (a) receive one of the input signals;
  (b) determine which one of the images is associated with the received input signal; and
  (c) cause an image forming device to produce an array of secondary energy streams which are operable to form laser-treated regions associated with a determined image, the image forming device being operatively coupled to the processor, the image forming device having:
    (i) an energy device including an energy source, the energy device operable to output a plurality of pulses of energy along a path, each of the pulses including a primary energy stream;
    (ii) a support which supports the energy device; and
    (iii) an image control device supported by the support and positioned to intersect the path, the image control device having a face which defines a plurality of cavities, the image control device having a plurality of elements, each one of the elements being movably positioned within one of the cavities between an outward position and an inward position, the image control device operable to:
      (x) receive the pulses of energy at different times; and
      (y) for each one of the received pulses of energy:
        (1) output an output pulse of energy, the output pulses of energy forming the array of secondary energy streams which are reflectable away from the face of the image control device toward an object, each one of the secondary energy streams being caused, at least in part, by one of the elements having the outward position, the secondary energy streams operable to form the laser-treated regions in the object, the laser-treated regions being associated with the determined and image;
        (2) substantially absorb a portion of the received pulse due, at least in part, to a least one of the elements having the inward position: or substantially direct the portion of the received pulse away from the object due, at least in part, to the at least one element having the inward position.

2. The image management system of claim 1, wherein the image control device includes a processor which is operable to cause the image control device to vary a plurality of the output pulses after different events occur, each one of the output pulses producing different arrays of secondary energy streams associated with different images.

3. The image management system of claim 1, wherein the memory device stores data associated with a plurality of different images, each one of the different images associated with a different array of secondary energy streams, the processor operable to: (a) determine an event associated with a designated one of the images; and (b) cause the image control device to produce the array of secondary energy streams associated with the designated image.

4. The image management system of claim 1, wherein: outward position results in one of the secondary energy streams; and (b) the inward position results in incoherent light.

5. The image management system of claim 4, wherein: (a) each one of the elements has a substantially circular shape; and (b) the secondary energy streams that reach the object are operable to form a matrix code image on the object.

6. The image management system of claim 4, wherein: (a) the elements are arranged in a pattern of rows and columns; and (b) the array of secondary energy streams that reaches the object forms a partially or fully grid-shaped code image on the object.

7. The image management system of claim 4, wherein: (a) each one of the elements has a substantially rectangular shape; and (b) the secondary energy streams that reach the object are operable to form a barcode image on the object.

8. The image management system of claim 1, wherein the energy stream includes a flow of light energy or atomic particles.

9. An image management system comprising:
  a memory device accessible by at least one processor, the memory device configured to be operatively coupled to an input device, the input device operable to produce a plurality of input signals associated with a plurality of different images, the memory device storing a plurality of instructions, the instructions directing the processor to:
  (a) receive one of the input signals;
  (b) determine which one of the images is associated with the received input signal; and
  (c) cause an image forming device to produce an array of secondary energy streams which are operable to form laser-treated regions associated with a determined image, the image forming device being operatively coupled to the processor, the image forming device having:
(i) an energy device including an energy source, the energy source operable to output a series of energy beam spurts along a path;
(ii) a support which supports the energy device;
(iii) a beam modifier supported by the support and positioned to intersect the path, the beam modifier having a face which defines a plurality of cavities, the beam modifier having a plurality of beam regulators, each one of the beam regulators being movably positioned within one of the cavities between an outward position and an inward position, the beam modifier operable to:
(x) receive the energy beams spurts at different times; and
(y) for each one of the received energy beam spurts;
(1) convert the received energy beam spurts to a designated one of a plurality of arrays of energy beams which are reflectable away from the face of the beam modifier toward an object, each one of the energy beams being caused, at least in part, by one of the beam regulators having the outward position, the energy beams operable to form a plurality of spaced-apart laser-treated regions in the object, the laser-treated regions being associated with the determined image; and
(2) substantially absorb a portion of the received energy beam spurt due, at least in part, to at least one of the beam regulators having the inward position; or substantially direct the portion of the received energy beam spurt away from the object due, at least in part, to the at least one beam regulator having the inward position.

10. The image management system of claim 9, which includes at least one instruction executable by the processor, the instruction operable to cause the beam modifier to control which portions of each of the energy beam spurts will be directed toward the object and which portions of said energy beam spurt will be directed away from the object.

11. The image management system of claim 9, wherein the processor is programmed to control movement of the beam regulators to determine the designated array of energy beams which flow toward the object.

12. The image management system of claim 9, wherein the image includes an image selected from the group consisting of a barcode image, a partial grid-shape image, a full grid shape image, a matrix image, a symbol image, a letter image, a numeral image, text image and an identifier image.

13. The image management system of claim 12, wherein each one of the energy beam spurts includes a packet of energy selected from the group consisting of a packet of light particles, a packet of photons, a packet of emitted energy, a packet including a laser beam, a packet of magnetic radiation, a packet of atomic particles and a packet of sub-atomic particles.

14. An image management system comprising:
a memory device accessible by at least one processor, the memory device configured to be operatively coupled to an input device, the input device being operable to produce a plurality of input signals associated with a plurality of different images, each of the images associated with a plurality of spaced-apart laser beam marks, the memory device storing a plurality of instructions, the instructions directing the processor to:
(a) receive one of the input signals;
(b) determine which one of the images is associated with the received input signal; and
(c) cause an image forming device to produce the array of secondary energy streams which are operable to form the laser-treated regions associated with the determined image, the image forming device being operatively coupled to the processor, the image forming device having:
(i) a pulse laser operable to output a series of laser beam pulses;
(ii) a frame which supports the pulse laser;
(iii) a beam expander supported by the frame and positioned to receive the laser beam pulses;
(iv) an image control device supported by the frame, the image control device including:
(x) a beam absorber which defines an array of openings, each one of the openings of the beam absorber defining a cavity;
(y) a plurality of beam reflectors, each one of the beam reflectors movably positioned within one of the cavities between an outward position and an inward position; and
(z) at least one position control device operable, for each one of the laser beam pulses, to move each one of the beam reflectors between: (i) one position wherein a portion of the laser beam pulse enters the opening and travels along a path leading to an object in a form of a laser beam; and (ii) another position wherein a portion of the laser beam pulse enters the opening and is substantially absorbed or substantially directed away from the object, the position control device operable to cause the image control device to output a set of the laser beams at one time, wherein the laser beams in the set are operable to form a plurality of spaced-apart cavities in the object, the cavities being associated with the designated image for the object; and
(v) a beam focuser supported by the frame and positioned in the path.

15. The image management system of claim 14, wherein the image control device has a face, and the beam absorber is an outer portion of the face.

16. The image management system of claim 14, wherein the position control device includes at least one actuator.

17. The image management system of claim 14, wherein at least one of the different images includes an image selected from the group consisting of a machine-readable code image, a machine-scannable code image, a barcode image, a matrix code image, a dot matrix code image, a symbol image, a numeral image, text image, a drawing image and an art image.

18. An image management system comprising:
a memory device accessible by at least one processor, the memory device configured to be operatively coupled to an input device, the input device being operable to produce a plurality of input signals associated with a plurality of different images, each of the images associated with a plurality of spaced-apart laser beam marks, the memory device storing a plurality of instructions, the instructions directing the processor to:
(a) receive one of the input signals;
(b) determine which one of the images is associated with the received input signal; and (c) cause an image forming device to produce the array of secondary energy streams which are operable to form the laser-treated regions associated with the determined image, the image forming device being operatively coupled to the processor, the image forming device having:
  (i) a pulse laser operable to output a series of laser beam pulses;
  (ii) a frame which supports the pulse laser;
  (iii) a beam expander supported by the frame and positioned to receive the laser beam pulses;
  (iv) an image control device supported by the frame, the image control device including:
    (x) a beam absorber which defines an array of openings;
    (y) a plurality of beam reflectors, each one of the beam reflectors movably positioned within or adjacent to one of the openings;
    (z) at least one position control device operable, for each one of the laser beam pulses, to move each one of the beam reflectors between: (i) one position wherein a portion of the laser beam pulse enters the opening and travels along a path leading to an object in a form of a laser beam; and (ii) another position wherein a portion of the laser beam pulse enters the opening and is substantially absorbed or substantially directed away from the object, the image control device operable to cause the image control device to output a set of the laser beams at one time, wherein the laser beams in the set are operable to form a plurality of spaced-apart cavities in the object, the cavities being associated with the designated image for the object;
  (v) a beam focuser supported by the frame and positioned in the path; and
  (vi) a plurality of pivotal couplers which pivotally couple the reflectors to the laser beam absorber.

19. The image management system of claim 18, wherein the position control device includes at least one actuator.

20. The image management system of claim 18, wherein at least one of the different images includes an image selected from the group consisting of a machine-readable code image, a machine-scannable code image, a barcode image, a matrix code image, a dot matrix code image, a symbol image, a numeral image, text image, a drawing image and an art image.

21. An image management system comprising:
a memory device accessible by at least one processor, the memory device configured to be operatively coupled to an input device, the input device being operable to produce a plurality of input signals associated with a plurality of different images, each of the images associated with a plurality of spaced-apart laser beam marks, the memory device storing a plurality of instructions, the instructions directing the processor to:
(a) receive one of the input signals;
(b) determine which one of the images is associated with the received input signal; and
(c) cause an image forming device to produce the array of secondary energy streams which are operable to form the laser-treated regions associated with the determined image, the image forming device being operatively coupled to the processor, the image forming device having:
  (i) a pulse laser operable to output a series of laser beam pulses;
  (ii) a frame which supports the pulse laser;
  (iii) a beam expander supported by the frame and positioned to receive the laser beam pulses;
  (iv) an image control device supported by the frame, the image control device including:
    (x) a beam absorber which defines an array of openings;
    (y) a plurality of beam reflectors, each one of the beam reflectors movably positioned within or adjacent to one of the openings;
    (z) at least one position control device operable, for each one of the laser beam pulses, to move each one of the beam reflectors between: (i) one position wherein a portion of the laser beam pulse enters the opening and travels along a path leading to an object in a form of a laser beam; and (ii) another position wherein a portion of the laser beam pulse enters the opening and is substantially absorbed or substantially directed away from the object, the image control device operable to cause the image control device to output a set of the laser beams at one time, wherein the laser beams in the set are operable to form a plurality of spaced-apart cavities in the object, the cavities being associated with the designated image for the object, the position control device having at least one air pressurization assembly; and
  (v) a beam focuser supported by the frame and positioned in the path.

22. The image management system of claim 21, wherein the position control device includes at least one actuator.

23. The image management system of claim 21, wherein at least one of the different images includes an image selected from the group consisting of a machine-readable code image, a machine-scannable code image, a barcode image, a matrix code image, a dot matrix code image, a symbol image, a numeral image, text image, a drawing image and an art image.

24. An image management system comprising:
a memory device accessible by at least one processor, the memory device configured to be operatively coupled to an input device, the input device being operable to produce a plurality of input signals associated with a plurality of different images, the memory device storing a plurality of instructions, the instructions directing the processor to:
(a) receive one of the input signals;
(b) determine which one of the images is associated with the received input signal; and
(c) cause an image forming device to produce an array of secondary energy streams which are operable to form laser-treated regions associated with a determined image, the image forming device being operatively coupled to the processor, the image forming device having:
  (i) an energy device including an energy source, the energy device operable to output a plurality of pulses of energy along a path, each of the pulses including a primary energy stream;
  (ii) a support which supports the energy device; and
  (iii) an image control device supported by the support and positioned to intersect the path, the image control device having a face which defines a plurality of openings, the image control device having a plurality of movable elements which are pivotable about an axis, the image control device having a plurality of couplers which pivotally couple the elements to the face, each one of the couplers extending at least partially along one of the axes, the image control device operable to:
(x) receive the pulses of energy at different times; and
(y) for each one of the received pulses of energy:
(1) output an output pulse of energy, the output pulses of energy forming an array of secondary energy streams which are reflectable away from the face of the image control device toward an object, each one of the secondary energy streams being caused, at least in part, by one of the elements having a first position, the secondary energy streams operable to form the laser-treated regions in the object, the laser-treated regions being associated with the determined image; and
(2) substantially absorb a portion of the received pulse due, at least in part, to at least one of the elements having a second position; or substantially direct the portion of the received pulse away from the object due, at least in part, to the at least one element having the second position.

25. The image management system of claim 24, wherein the image control device includes a processor which is operable to cause the image control device to vary a plurality of the output pulses after different events occur, each one of the output pulses producing different arrays of secondary energy streams associated with different images.

26. The image management system of claim 24, wherein the image control device includes at least one processor having access to a memory device, the memory device storing data associated with a plurality of different images, each one of the different images associated with a different array of secondary energy streams, the processor operable to: (a) determine an event associated with a designated one of the images; and (b) cause the image control device to produce the array of secondary energy streams associated with the designated image.

27. The image management system of claim 24, wherein: (a) the elements are arranged in a pattern of rows and columns; and (b) the array that reaches the object forms a partially or fully grid-shaped code image on the object.

28. The image management system of claim 24, wherein: (a) each one of the elements has a substantially rectangular or circular shape; and (b) the secondary energy streams that reach the object are operable to form a barcode image on the object.

29. An image management system comprising:
a memory device accessible by at least one processor, the memory device configured to be operatively coupled to an input device, the input device operable to produce a plurality of input signals associated with a plurality of different images, the memory device storing a plurality of instructions, the instructions directing the processor to:
(a) receive one of the input signals;
(b) determine which one of the images is associated with the received input signal; and
(c) cause an image forming device to produce an array of secondary energy streams which are operable to form laser-treated regions associated with the determined image, the image forming device being operatively coupled to the processor, the image forming device having:
(i) an energy device including an energy source, the energy source operable to output a series of energy beam spurts along a path;
(ii) a support which supports the energy device;
(iii) a beam modifier supported by the support and positioned to intersect the path, the beam modifier having a face which defines a plurality of openings, the image control device having a plurality of beam regulators which are movable about an axis between a first position and a second position, the image control device having a plurality of couplers, each one of the couplers pivotally coupling one of the beam regulators to the face, each one of the couplers extending, at least in part, along one of the axes, the beam modifier operable to:
(x) receive the energy beams spurts at different times; and
(y) for each one of the received energy beam spurts:
(1) convert each one of the energy beam spurts to a designated one of a plurality of arrays of energy beams which are reflectable away from the face of the beam modifier toward an object, the energy beams being caused, at least in part, by the beam regulators having the first positions, the energy beams operable to form a plurality of spaced-apart laser-treated regions in the object, the laser-treated regions being associated with the determined image; and
(2) substantially absorb a portion of the received energy beam spurt due, at least in part, to at least one of the beam regulators having the second position: or substantially direct the portion of the received energy beam spurt away from the object due, at least in part, to the at least one beam regulator having the second position.

30. The image management system of claim 29, which includes at least one instruction executable by the processor, the instruction operable to cause the beam modifier to control which portions of each of the energy beam spurts will be directed toward the object and which portions of said energy beam spurt will be directed away from the object.

31. The image management system of claim 29, wherein the processor is programmed to control movement of the beam regulators to determine the designated array of energy beams which flow toward the object.

32. The image management system of claim 29, wherein the image includes an image selected from the group consisting of a barcode image, a partial grid-shape image, a full grid shape image, a matrix image, a symbol image, a letter image, a numeral image, text image and an identifier image.

33. The image management system of claim 32, wherein each one of the energy beam spurts includes a packet of energy selected from the group consisting of a packet of light particles, a packet of photons, a packet of emitted energy, a packet including a laser beam, a packet of magnetic radiation, a packet of atomic particles and a packet of sub-atomic particles.

* * * * *